(12) United States Patent
Mak

(10) Patent No.: US 11,913,532 B1
(45) Date of Patent: Feb. 27, 2024

(54) DOMINO-TYPE TORQUE GENERATOR

(71) Applicant: Chi Yin Mak, Hong Kong (HK)

(72) Inventor: Chi Yin Mak, Hong Kong (HK)

( * ) Notice: Subject to any disclaimer, the term of this patent is extended or adjusted under 35 U.S.C. 154(b) by 0 days.

(21) Appl. No.: 18/213,924

(22) Filed: Jun. 26, 2023

Related U.S. Application Data

(60) Provisional application No. 63/453,797, filed on Mar. 22, 2023, provisional application No. 63/450,376, filed on Mar. 6, 2023.

(51) Int. Cl.
| | | |
|---|---|---|
| *F16H 48/05* | (2012.01) | |
| *F16H 48/08* | (2006.01) | |
| *F16H 48/06* | (2006.01) | |
| *B60K 17/346* | (2006.01) | |
| *B60K 6/26* | (2007.10) | |
| *H02K 1/06* | (2006.01) | |
| *H02K 7/00* | (2006.01) | |

(Continued)

(52) U.S. Cl.
CPC ............ *F16H 48/08* (2013.01); *F16H 37/04* (2013.01); *F16H 48/05* (2013.01); *F16H 48/06* (2013.01); *F16H 48/40* (2013.01); *B60K 6/26* (2013.01); *B60K 17/346* (2013.01); *B60K 2006/4833* (2013.01); *F16H 48/10* (2013.01); *F16H 2048/085* (2013.01); *H02K 1/06* (2013.01); *H02K 7/006* (2013.01); *H02K 17/30* (2013.01); *H02K 19/36* (2013.01); *H02K 99/10* (2016.11)

(58) Field of Classification Search
CPC .... F16H 48/08; F16H 48/40; F16H 2048/085; F16H 37/04; F16H 48/05; F16H 48/06; F16H 48/10; B60K 6/26; B60K 2006/4833; B60K 17/32–3467; H02K 1/06; H02K 53/00; H02K 39/00; H02K 99/10; H02K 7/006; H02K 7/065; H02K 7/00–20; H02K 17/006; H02K 19/36
See application file for complete search history.

(56) References Cited

U.S. PATENT DOCUMENTS

| | | | | |
|---|---|---|---|---|
| 4,520,690 A | * | 6/1985 | Dangel | F16H 48/05 |
| | | | | 475/221 |
| 4,706,517 A | * | 11/1987 | Garrett | B60K 17/346 |
| | | | | 475/221 |

(Continued)

FOREIGN PATENT DOCUMENTS

| | | | | |
|---|---|---|---|---|
| CN | 106090174 A | * | 11/2016 | ......... F16H 37/0806 |
| EP | 0422221 A1 | * | 4/1991 | ............. H02K 53/00 |

*Primary Examiner* — Tinh Dang

(57) ABSTRACT

A domino-type torque generator includes a base member, and a plurality of toppling members pivotally connected to the base member. Each toppling member is pivotable from an upright position to an inclined position, or from the inclined position directly to an opposite inclined position, about a torque shaft extending transversely through a lower end portion of each toppling member. One end of each torque shaft is provided with a pinion. A first differential gear is connected to the pinions to accumulate torques applied on the torque shafts by toppling of the toppling members. A rotating cage of the first differential gear is the output, and is directly or indirectly connected to one of the side gears of the next differential gear, which is used to accumulate output torque from the first differential gear. A drive mechanism is configured to repeatedly drive the toppling members to topple, thereby continuously generating torques.

20 Claims, 19 Drawing Sheets

(51) Int. Cl.
   *H02K 99/00* (2014.01)
   *F16D 48/06* (2006.01)
   *F16H 48/40* (2012.01)
   *F16H 37/04* (2006.01)
   *B60K 6/48* (2007.10)
   *F16H 48/10* (2012.01)
   *H02K 17/30* (2006.01)
   *H02K 19/36* (2006.01)

(56) References Cited

U.S. PATENT DOCUMENTS

| | | | | |
|---|---|---|---|---|
| 4,762,022 | A * | 8/1988 | Johnshoy | F16H 48/29 |
| | | | | 475/221 |
| 5,446,319 | A * | 8/1995 | Pawlowski | H02K 33/00 |
| | | | | 318/135 |
| 5,662,009 | A * | 9/1997 | Palmer | F16H 31/001 |
| | | | | 475/221 |
| 5,910,060 | A * | 6/1999 | Blume | B60K 17/16 |
| | | | | 475/221 |
| 6,447,419 | B1 * | 9/2002 | Irikura | B62D 11/183 |
| | | | | 475/24 |
| 6,672,986 | B2 * | 1/2004 | Zhou | F16H 48/11 |
| | | | | 475/221 |
| 10,001,196 | B2 * | 6/2018 | Chung | F16H 3/62 |
| 10,584,773 | B2 * | 3/2020 | Siwko | F16H 48/06 |
| | | | | 475/296 |
| 10,774,901 | B2 * | 9/2020 | Chung | F16H 3/74 |

* cited by examiner

FIG. 10(a)
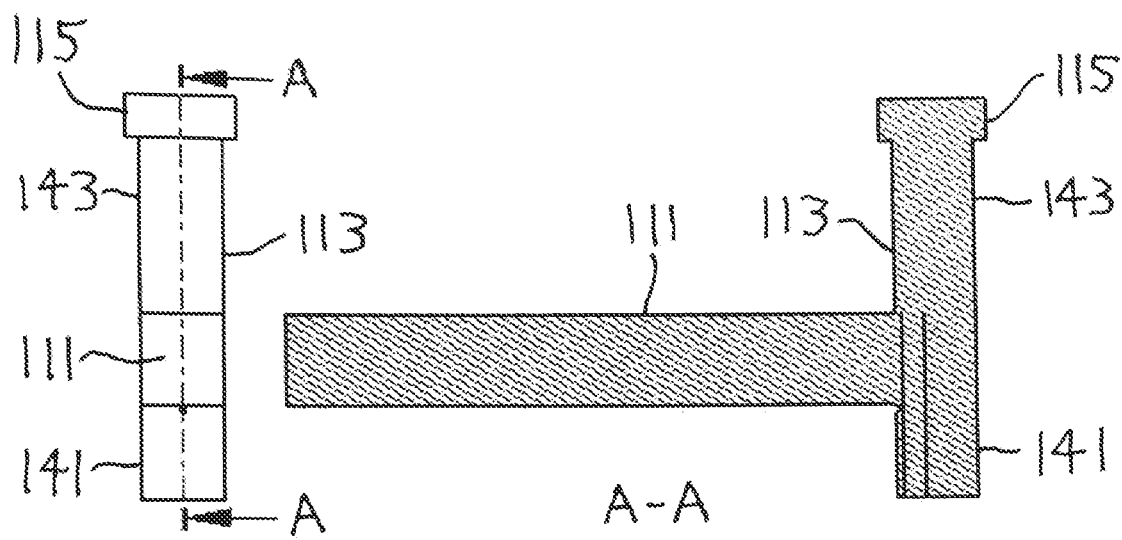
FIG. 10(b)
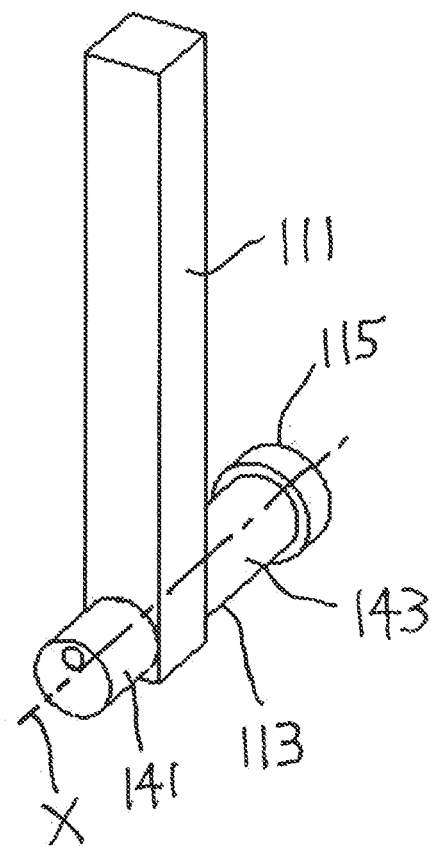
FIG. 10(c)

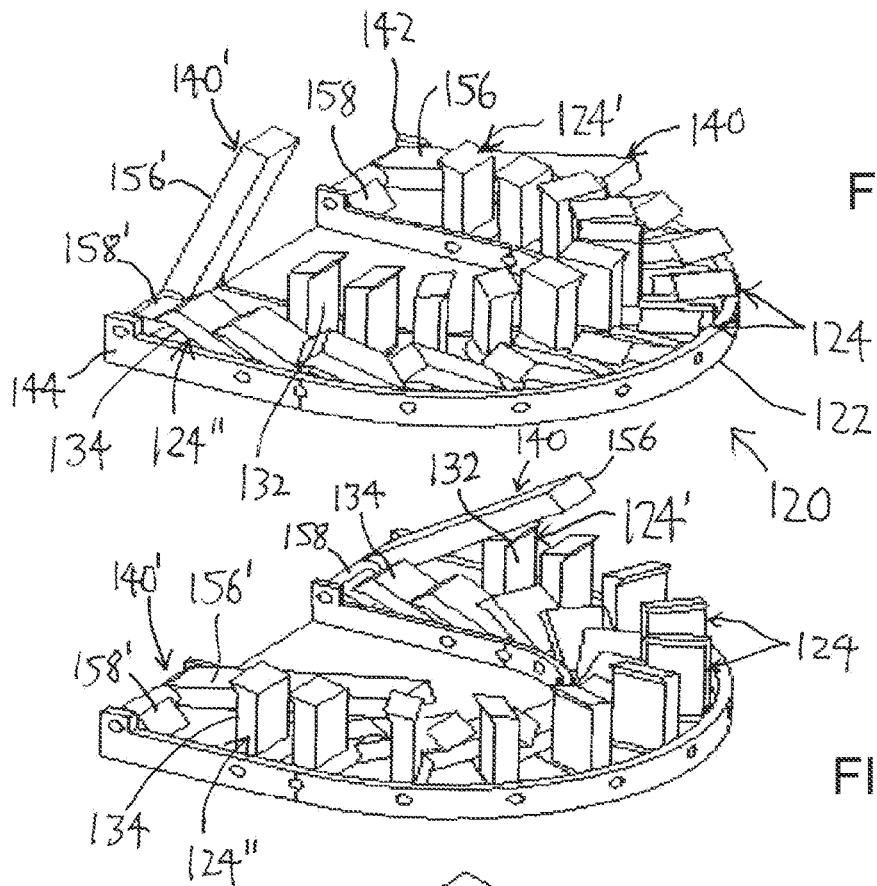
FIG. 14(a)
FIG. 14(b)
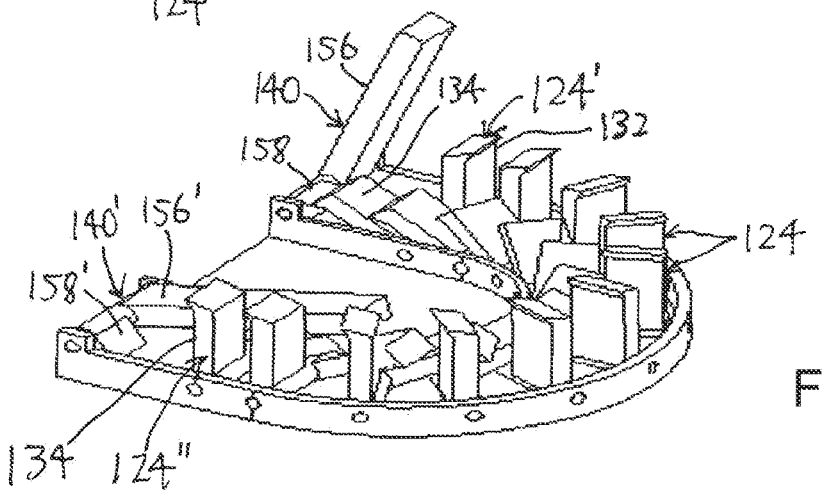
FIG. 14(c)
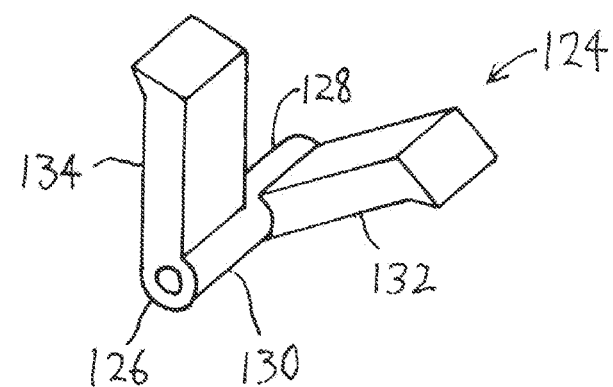
FIG. 15

DOMINO-TYPE TORQUE GENERATOR

CROSS-REFERENCE TO RELATED APPLICATIONS

This application claims the benefit of U.S. Provisional Application No. 63/450,376 filed on Mar. 6, 2023 and U.S. Provisional Application No. 63/453,797 filed on Mar. 22, 2023, the entire content of which is hereby incorporated by reference in its entirety.

TECHNICAL FIELD

The present disclosure relates to the field of torque generators, and particular to a domino-type torque generator.

BACKGROUND TECHNOLOGY

It is known in the art that dominoes have the following characteristics: (i) when a domino topples and hits the following dominoes, it will cause the following dominoes to topple, (ii) a domino can make more than one domino to topple in any directions, for example, by a built-in object or mechanism, (iii) a domino can make a larger domino next to it to topple, (iv) a domino can make the next uphill or spiral dominoes to topple, (v) dominoes can have many shapes, and (vi) dominoes can topple around a circular path. In view of these characteristics of the dominoes, there is a need to make use of these special characteristics to produce a domino-type torque generator to generate torques.

SUMMARY

According to one aspect of the present disclosure, there is provided a domino-type torque generator which may include a base member; a plurality of toppling members pivotally connected to the base member, each of the plurality of toppling members being pivotable from an upright position to an inclined position or from the inclined position to an opposite inclined position, the plurality of toppling members being arranged successively and sequentially along at least one path, and so spaced apart from one another that when a first one of the plurality of toppling members topples from its upright position to its inclined position, following ones of the plurality of toppling members topple successively and sequentially from their upright position to their inclined position, until a last one of the plurality of toppling members topples from its upright position to its inclined position, thereby producing a domino effect; a torque shaft fixedly connected to and extending transversely through a lower end portion of each of the plurality of toppling members, whereby toppling of each of the plurality of toppling members generates a torque on the torque shaft, the torque shaft defining a pivot axis about which each of the plurality of toppling members pivots, each torque shaft having a first section extending from a first side of the lower end portion of each of the plurality of toppling members, and an elongated second section extending from an opposite second side of the lower end portion of each of the plurality of toppling members, the first section and the elongated second section being pivotably mounted on the base member; a pinion fixedly mounted at a free end of the elongated second section of the torque shaft of each of the plurality of toppling members; a plurality of differential gear assemblies connected directly or indirectly to the pinions of the torque shafts of selected ones the plurality of toppling members, and served as a plurality of accumulators to accumulate torques generating on the torque shafts of the selected ones of the plurality of toppling members; and a drive mechanism configured to repeatedly drive the plurality of toppling members to pivot from their upright position to their inclined position or from their inclined position to their opposite inclined position, and pivot from their inclined position to their upright position or from their opposite inclined position to their inclined position, thereby continuously toppling the plurality of toppling members, and continuously generating the torques.

In one embodiment, the plurality of differential gear assemblies may include a first differential gear assembly including a first side gear, a second side gear, and a first output gear of a first rotating cage for torque output, the first side gear of the first differential gear assembly being engageable with the pinion of the torque shaft of a first selected one of the plurality of toppling members, the second side gear of the first differential gear assembly being engageable with the pinion of the torque shaft of a second selected one of the plurality of toppling members; and a second differential gear assembly including a third side gear, a fourth side gear, and a second output gear of a second rotating cage for torque output, one of the third and fourth side gears of the second differential gear assembly being engageable directly or indirectly with the first output gear of the first rotating cage of the first differential gear assembly, whereby torques generated by the toppling of the first and second selected ones of the plurality of toppling members are transmitted to the first and second side gears of the first differential gear assembly respectively, accumulated by the first differential gear assembly, and output through the first output gear of the first rotating cage of the first differential gear assembly; an accumulated torque output through the first output gear of the first rotating cage of the first differential gear assembly is transmitted to one of the first and second side gears of the second differential gear assembly, and whereby torques transmitted to the first and second side gears of the second differential gear assembly are accumulated by the second differential gear assembly, and output through the second output gear of the second rotating cage of the second differential gear assembly, until a final accumulated torque is output through a last rotating cage of a last differential gear assembly.

In one embodiment, the at least one path may include a closed path.

In one embodiment, the drive mechanism may include a bottom weight member attached to and extending downwards from the torque shaft provided at the lower end portion of each of the plurality of toppling members, and the bottom weight member has a weight sufficient to automatically drive each of the plurality of toppling members from its inclined position back to its upright position.

In one embodiment, the drive mechanism may include an electrical or electronic switch connected to the last one of the plurality of toppling members, and after the last one of the plurality of toppling members topples, the electrical or electronic switch drives the first one of the plurality of toppling members from its inclined position back to its upright position or its opposite inclined position.

In one embodiment, the drive mechanism may include a top weight member provided on an upper end of the first one of the plurality of toppling members, the top weight member extending outwards in a direction in which the first one of the plurality of toppling members topples, and when the first one of the plurality of toppling members is in its upright position, the first one of the plurality of toppling members topples automatically by means of a weight of the top weight member.

In one embodiment, the drive mechanism may include an electrical or electronic switch configured to drive the first one of the plurality of toppling members to topple from its upright position to its inclined position, so that the following ones of the plurality of toppling members topple successively and sequentially from their upright position to their inclined position, until the last one of the plurality of toppling members topples from its upright position to its inclined position, wherein the plurality of toppling members is driven automatically and successively from their inclined position back to their upright position by means of the weight of the bottom weight member provided on each of the plurality of toppling members, and wherein the electrical or electronic switch is configured to drive the first one of the plurality of toppling members to topple again, thereby continuously toppling the plurality of toppling members along the closed path, and continuously generating torques.

In one embodiment, the base member is an annular base member and the closed path is a circular path, and wherein the domino-type torque generator may further include a rotatable vertical shaft provided at a center of the annular base member; and a drive assembly mounted between the rotatable vertical shaft and the plurality of toppling members, and configured to gather driving forces generated from toppling of the plurality of toppling members and drive the rotatable vertical shaft to rotate, wherein the drive assembly can be magnets and magnetically attractive materials, gear assemblies, generators, or pressure pumps, etc.

In one embodiment, the base member has a first end and a second end, the at least one path includes a non-closed path, the first one of the plurality of toppling members is pivotally mounted on the first end of the base member, and the last one of the plurality of toppling members is pivotally mounted on the second end of the base member, wherein the drive mechanism may include a first motor mounted on one side of the base member, and configured to turn the first one of the plurality of toppling members in a first direction from its inclined position directly to its opposite inclined position, so that the following ones of the plurality of toppling members are turned successively and sequentially in the first direction from their inclined position directly to their opposite inclined position, until the last one of the plurality of toppling members is turned in the first direction from its inclined position directly to its opposite inclined position; and a second motor mounted on the one side of the base member, and configured to turn the last one of the plurality of toppling members in an opposite second direction from its opposite inclined position directly to its inclined position, so that the following ones of the plurality of toppling members are turned successively and sequentially in the second direction from their opposite inclined position directly to their inclined position, until the first one of the plurality of toppling members is turned in the second direction from its opposite inclined position directly to its inclined position.

In one embodiment, the base member has a first end and a second end, the at least one path includes a non-closed path, the first one of the plurality of toppling members is pivotally mounted on the first end of the base member, and the last one of the plurality of toppling members is pivotally mounted on the second end of the base member, wherein the drive mechanism may include a third motor; a first drive member connected to and driven by the third motor, the third motor being mounted at the first end of the base member, and facing an outwardly facing surface of the first one of the plurality of toppling members, the first drive member of the third motor being configured to push the first one of the plurality of toppling members in a first direction from its inclined position directly to its opposite inclined position, so that the following ones of the plurality of toppling members are pushed successively and sequentially in the first direction from their inclined position directly to their opposite inclined position, until the last one of the plurality of toppling members is pushed in the first direction from its inclined position directly to its opposite inclined position; a fourth motor; and a second drive member connected to and driven by the fourth motor, the fourth motor being mounted at the second end of the base member, and facing an outwardly facing surface of the last one of the plurality of toppling members, the second drive member of the fourth motor being configured to push the last one of the plurality of toppling members in an opposite second direction from its opposite inclined position directly to its inclined position, so that the following ones of the plurality of toppling members are pushed successively and sequentially in the second direction from their opposite inclined position directly to their inclined position, until the first one of the plurality of toppling members is pushed in the second direction from its opposite inclined position directly to its inclined position.

In one embodiment, each of the plurality of toppling members may include a first torque shaft pivotably connected to the base member, the first torque shaft having a first half section and a second half section; a first toppling portion extending laterally and outwardly from the first half section of the first torque shaft; and a second toppling portion extending laterally and outwardly from the second half section of the first torque shaft, wherein the first and second toppling portions are oriented at a first angle with respect to each other about the first torque shaft, so that when the first toppling portion pivots to its upright position, the second toppling portion pivots at the same time to its inclined position; and when the first toppling portion pivots to its inclined position, the second toppling portion pivots at the same time to its upright position.

In one embodiment, the drive mechanism may include a first switch and a second switch, the first switch being pivotally connected to a first end of the base member, and the second switch being pivotally connected to a second end of the base member, each of the first switch and the second switch may include a second torque shaft pivotably connected to the base member, the second torque shaft having a first half section and a second half section; an elongated switch portion extending laterally and outwardly from the first half section of the second torque shaft, and moveable between an up and inclined position and a down position, the elongated switch portion having a length longer than a length of the plurality of toppling members, and a weight sufficient to topple a following toppling member; and a shortened switch portion extending laterally and outwardly from the second half section of the second torque shaft, and moveable between an up and inclined position and a down position, the shortened switch portion having a length shorter than the length of the plurality of toppling members, wherein the elongated switch portion and the shortened switch portion are oriented at a second angle with respect to each other about the second torque shaft, so that when the shortened switch portion pivots from its up and inclined position to its down position, the elongated switch portion pivots from its up and inclined position to its down position; and when the shortened switch portion pivots from its down position to its up and inclined position, the elongated switch portion pivots from its down position to its up and inclined position, and wherein the elongated switch portion of the first switch is in connection with the first toppling portion of the first one of the plurality of toppling members, the shortened switch portion of the first switch is in connection with the second toppling portion of the first one of the plurality of toppling members, and the elongated switch portion of the second switch is in connection with the second toppling portion of the last one of the plurality of toppling members, the shortened switch portion of the second switch is in connection with the first toppling portion of the last one of the plurality of toppling members.

In one embodiment, the first differential gear assembly may include the first rotating cage having a first side and a second side opposite the first side; the first output gear formed around an outer circumference of the first rotating cage, and rotatable with the first rotating cage; a first cross shaft mounted inside and across an interior of the first rotating cage; a first bevel gear and a second bevel gear rotatably mounted on the first cross shaft; a third bevel gear meshed with both the first bevel gear and the second bevel gear at one side of the first cross shaft; a fourth bevel gear meshed with both the first bevel gear and the second bevel gear at an opposite side of the first cross shaft; the first side gear disposed outside the first rotating cage at the first side thereof, and connected coaxially to and rotatable with the third bevel gear; and the second side gear disposed outside the first rotating cage at the second side thereof, and connected coaxially to and rotatable with the fourth bevel gear, wherein the first and second side gears of the first differential gear assembly are rotatably connected to the first rotating cage, one of the first and second side gears of the first differential gear assembly is sufficient to drive the first rotating cage, and another one of the first and second side gears of the first differential gear assembly is at a standstill stage or is driven at any speed.

In one embodiment, the second differential gear assembly may include the second rotating cage having a first side and a second side opposite the first side; the second output gear formed around an outer circumference of the second rotating cage, and rotatable with the second rotating cage; a second cross shaft mounted inside and across an interior of the second rotating cage; a fifth bevel gear and a sixth bevel gear rotatably mounted on the second cross shaft; a seventh bevel gear meshed with both the fifth bevel gear and the sixth bevel gear at one side of the second cross shaft; an eighth bevel gear meshed with both the fifth bevel gear and the sixth bevel gear at an opposite side of the second cross shaft; the third side gear disposed outside the second rotating cage at the first side thereof, and connected coaxially to and rotatable with the seventh bevel gear; the fourth side gear disposed outside the second rotating cage at the second side thereof, and connected coaxially to and rotatable with the eighth bevel gear through a first common shaft; a first connection gear meshed with the fourth side gear; and a second connection gear connected coaxially to and rotatable with the first connection gear through a second common shaft, the second connection gear being meshed with the first output gear of the first differential gear assembly, wherein the third and fourth side gears of the second differential gear assembly are rotatably connected to the second rotating cage, one of the third and fourth side gears of the second differential gear assembly is sufficient to drive the second rotating cage, and another one of the third and fourth side gears of the second differential gear assembly is at a standstill stage or is driven at any speed.

In one embodiment, any one of the plurality of differential gear assemblies may be replaceable by an epicyclic gear train. The epicyclic gear train may include a central sun gear; a plurality of planet gears meshed with and rotatable around the central sun gear; an outer ring gear meshed with the plurality of planet gears; and a carrier on which the plurality of planet gears are rotatably mounted, whereby external torques applied to the central sun gear and the outer ring gear are accumulated and output through the carrier.

In one embodiment, the at least one path may include an upper level and a lower level, the domino-type torque generator including a first plurality of toppling members disposed on the upper level; a second plurality of toppling members disposed on the lower level; a first link having an upper end connected to the first switch of the first plurality of toppling members on the upper level, and a lower end connected to the first switch of the second plurality of toppling members on the lower level; and a second link having an upper end connected to the second switch of the first plurality of toppling members on the upper level, and a lower end connected to the second switch of the second plurality of toppling members on the lower level.

In one embodiment, the first one of the plurality of toppling members is pivotally connected to the base member through a first torque shaft, a second toppling member following the first one of the plurality of toppling members is pivotally connected to the base member through a second torque shaft, and a third toppling member following the second toppling member is pivotally connected to the base member through a third torque shaft, wherein a height of the third toppling member is greater than a height of the second toppling member, and the height of the second toppling member is greater than a height of the first one of the plurality of toppling members, wherein a torque generated on the third torque shaft is greater than a torque generated on the second torque shaft, and the torque generated on the second torque shaft is greater than a torque generated on the first torque shaft when the first one of the plurality of toppling members, the second toppling member and the third toppling member topple successively, and when the first one of the plurality of toppling members, the second toppling member and the third toppling member topple successively, the first one of the plurality of toppling members, being smaller in size than the second toppling member, has a weight sufficient to drive the second toppling member to topple; and the second toppling member, being smaller in size than the third toppling member, has a weight sufficient to drive the third toppling member to topple.

In one embodiment, the at least one path may include a path with sharp turns, and the domino-type torque generator may include a vertical bar pivotally connected to an upper end of a first upright support at a first pivot point located at a lower end of the vertical bar; a first bar extending from an upper end of the vertical bar in a first direction, the first bar being pivotable about the first pivot point between an up position and a down position; a switch member extending from the lower end of the vertical bar in a second direction opposite the first direction, the switch member being pivotable about the first pivot point between an up position and a down position, the first bar being longer than the switch member so that the first bar topples from its up position to its down position by its own weight when the switch member is disengaged; a second bar pivotally connected to an upper end of a second upright support at a second pivot point offset from a center of the second bar, and forming a short portion and a long portion on opposite sides of the second pivot point, the short portion of the second bar urging upwards against an underside of the first bar due to a downward force of the long portion of the second bar, the short portion of the second bar being pivotable between an up position and a down position; a third bar pivotally connected to an upper end of a third upright support at a third pivot point offset from a center of the third bar, and forming a short portion and a long portion on opposite sides of the third pivot point, the short portion of the third bar urging upwards against an underside of the short portion of the second bar due to a downward force of the long portion of the third bar, the short portion of the third bar being pivotable between an up position and a down position; and a last bar pivotally connected to an upper end of a fourth upright support at a fourth pivot point offset from a center of the last bar, and forming a short portion and a long portion on opposite sides of the fourth pivot point, the short portion of the last bar urging upwards against an underside of the short portion of the third bar due to a downward force of the long portion of the last bar, the short portion of the last bar being pivotable between an up position where the short portion of the last bar is disengaged from the switch member and a down position where the short portion of the last bar is engaged with and pressing on an upper side of the switch member.

In one embodiment, the at least one path may include a path with sharp turns, and the domino-type torque generator may include a first base member having a first end and a second end; a first plurality of toppling members including a first toppling member located at the first end of the first base member, and a last toppling member located at the second end of the first base member; a second base member arranged side-by-side with the first base member, and having a first end and a second end; a second plurality of toppling members including a first toppling member located at the first end of the second base member, and a last toppling member located at the second end of the second base member; a first rod provided at the second end of the first base member, and pivotable about a first pivot point between an up position where the first rod is engageable by the last toppling member of the first plurality of toppling members, and a down position where an upper end of the first rod hits and topples the first toppling member of the second plurality of toppling members; and a second rod provided at the second end of the second base member, and pivotable about a second pivot point between an up position where the second is engageable by the last toppling member of the second plurality of toppling members, and a down position where an upper end of the second rod hits and topples the first toppling member of the first plurality of toppling members.

BRIEF DESCRIPTION OF THE DRAWINGS

Specific embodiments of the present disclosure will now be described by way of example with reference to the accompanying drawings wherein:

FIG. 10(a) is a side view of a toppling member being connected to a torque shaft according to an embodiment of the present disclosure.

FIG. 10(b) is a cross sectional view, taken along line A-A in FIG. 10(a), of the toppling member being connected to the torque shaft according to an embodiment of the present disclosure.

FIG. 10(c) is a perspective view of the toppling member being connected to the torque shaft according to an embodiment of the present disclosure.

FIG. 14(a) is a perspective view of a domino-type torque generator showing that the outer toppling portions of the toppling members are in their inclined position, and the inner toppling portions of the toppling members are in their upright position according to a third embodiment of the present disclosure.

FIG. 14(b) is a perspective view of the domino-type torque generator of FIG. 14(a) showing that the outer toppling portions of the toppling members are in their upright position, and the inner toppling portions of the toppling members are in their inclined position according to the third embodiment of the present disclosure.

FIG. 14(c) is a perspective view of the domino-type torque generator of FIG. 14(a) showing upward pivoting of an elongated switch portion of a first switch according to the third embodiment of the present disclosure.

FIG. 15 is an enlarged perspective view of the toppling member of FIGS. 14(a)-(c) according to the third embodiment of the present disclosure.

DETAILED DESCRIPTION

Figure 1A:
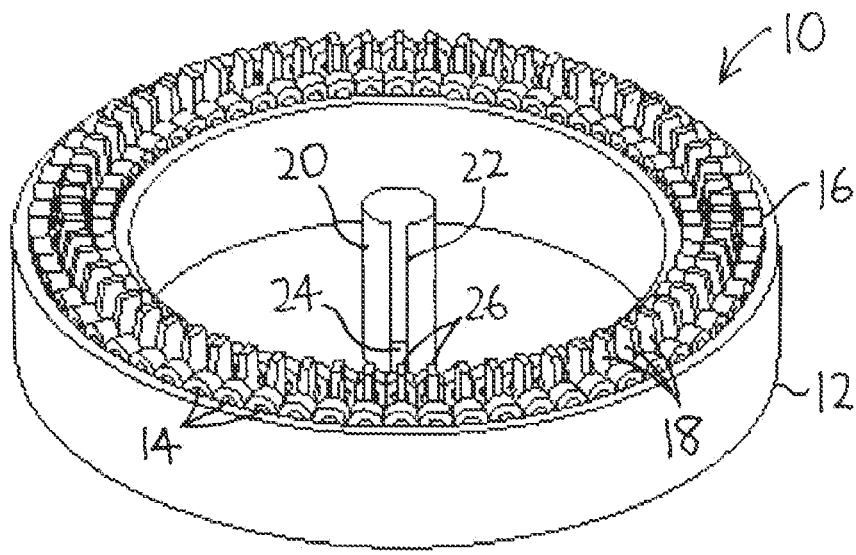
FIG. 1(a) is a perspective view of a domino-type torque generator showing all of the toppling members in their initial upright position and a radial arm is in its initial state according to a first embodiment of the present disclosure.

Reference will now be made in detail to preferred embodiments of the present disclosure, examples of which are also provided in the following description. Exemplary embodiments of the present disclosure are described in detail, although it will be apparent to those skilled in the relevant art that some features that are not particularly important to an understanding of the present disclosure may not be shown for the sake of clarity.

It should be noted that throughout the specification and claims herein, when one element is said to be "connected" to another, this does not necessarily mean that one element is fastened, secured, or otherwise attached to another element. Instead, the term "connected" means that one element is either connected directly or indirectly to another element or is in mechanical or electrical communication with another element.

As used herein, the term "domino" refers to the game of toppling of dominoes or tiles. The dominoes or tiles are stood up on their ends and are arranged next to each other in a desired sequence. When the first domino is toppled, the following dominoes are toppled by one another in succession. As used herein, the term "domino effect" is a mechanical effect which refers to a chain reaction that occurs when playing the game of toppling of dominoes or tiles, wherein a number of dominoes stood up on their ends in sequence are toppled by knocking down one domino, causing the rest of the dominoes to topple as well. As used herein, "domino-type torque generator" refers to a machine for generating torques by toppling of dominoes or tiles in succession.

FIGS. 1(a)-1(d) show a first embodiment of the domino-type torque generator of the present disclosure. In this embodiment, the domino-type torque generator 10 may have an annular base member 12 defining a circular path 16, which is a closed path. A plurality of toppling members (or dominoes) 18 can be pivotally connected to the annular base member 12 through torque shafts or pivot pins 14. The toppling members 18 may be rectangular in shape, or in any other possible shapes, such a curved shape.

Each of the plurality of toppling members 18 can be pivotable from an upright position to an inclined position or from an inclined position directly to an opposite inclined position. The plurality of toppling members 18 is arranged successively and sequentially around the circular path 16, and so spaced apart from one another that when a first one of the plurality of toppling members 18 topples from its upright position to its inclined position, following ones of the plurality of toppling members 18 topple successively and sequentially from their upright position to their inclined position, until a last one of the plurality of toppling members 18 topples from its upright position to its inclined position, thereby producing a domino effect. The toppling of each of the plurality of toppling members can generate a torque. It is understood that pivoting of the plurality of toppling members from their inclined position back to their upright position or their opposite inclined position can also generate torques by using some known methods.

The domino-type torque generator 10 may further include a rotatable vertical shaft 20 provided at a center of the annular base member 12, and a radial arm 22 having an inner end fixed to the rotatable vertical shaft 20, and an outer end extending to the plurality of toppling members 18. A magnet 24 may be fixed to the outer end of the radial arm 22, and a magnetically attractive material 26 (e.g., iron) may be fixed to each of the plurality of toppling members 18. It is understood that the magnetically attractive material 26 may be fixed to the outer end of the radial arm 22, and the magnet 24 may be fixed to each of the plurality of toppling members 18.

When the plurality of toppling members 18 topples from their upright position to their inclined position successively around the annular base member 12, the magnetically attractive material 26 fixed to each of the plurality of toppling members drives the radial arm 22 to rotate by the magnetic force generated by interaction of the magnet 24 with the magnetically attractive material 26. Rotation of the radial arm 22 drives the rotatable vertical shaft 20 to rotate, thereby generating a torque at the center of the annular base member 12. The toppling of the plurality of toppling members 18 around the circular path 16 can be repeated, resulting in continuous generation of torques.

Figure 1B:
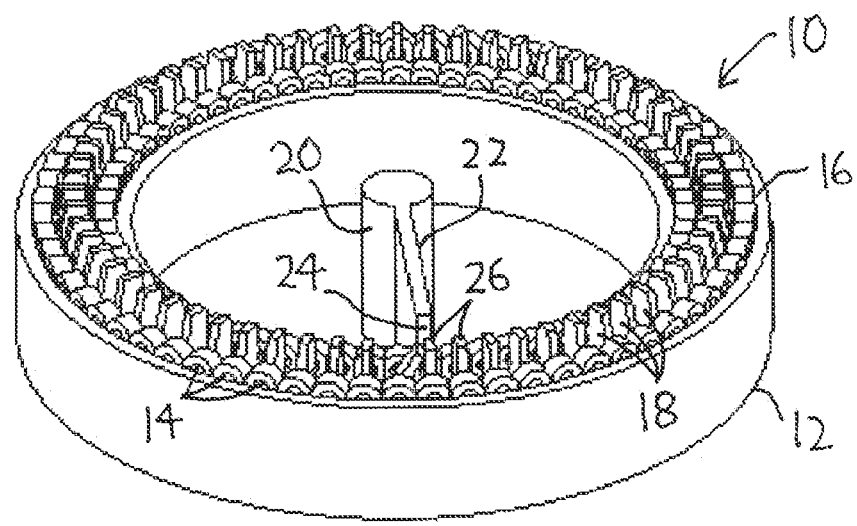
FIG. 1(b) is a perspective view of the domino-type torque generator of FIG. 1(a) showing the toppling of a first toppling member from its upright position to its inclined position and the radial arm is rotated anti-clockwise according to the first embodiment of the present disclosure.
Figure 1C:
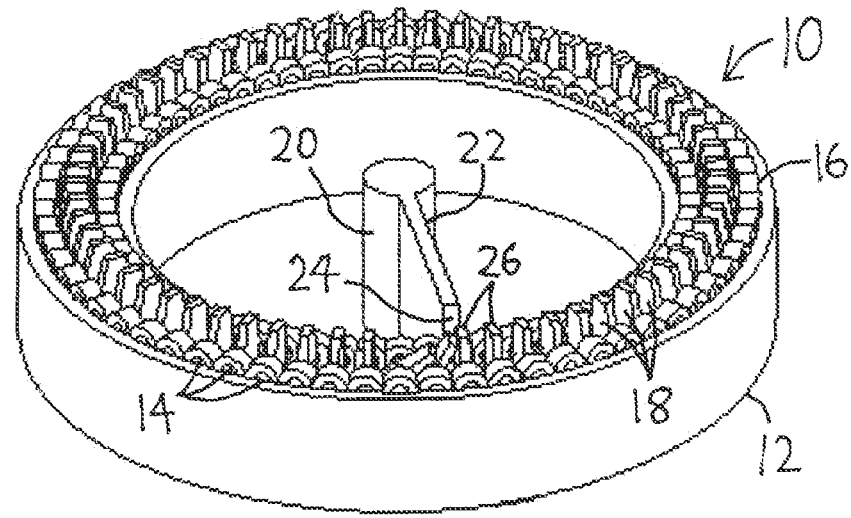
FIG. 1(c) is a perspective view of domino-type torque generator of FIG. 1(a) showing the toppling of a second toppling member from its upright position to its inclined position and the radial arm is rotated further anti-clockwise according to the first embodiment of the present disclosure.
Figure 1D:
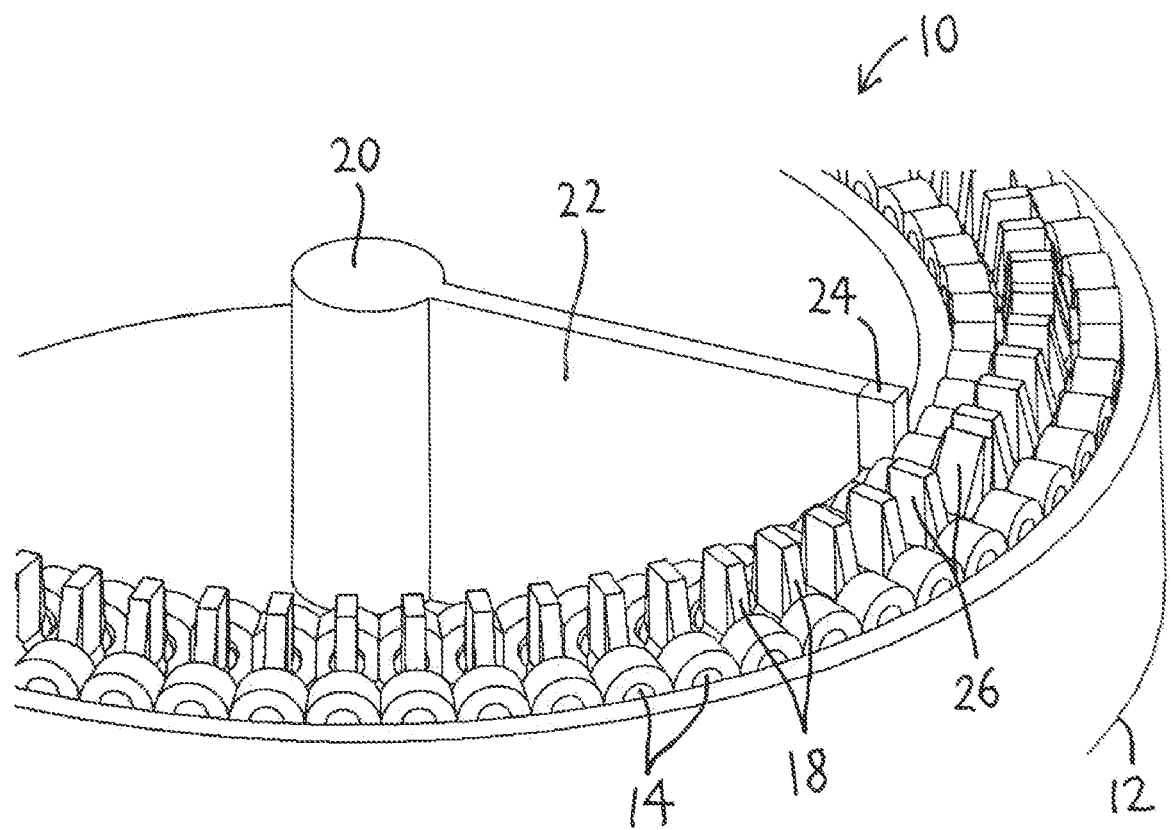
FIG. 1(d) is an enlarged framentary view of the domino-type torque generator showing the magnet and the magnetically attractive material according to the first embodiment of the present disclosure.

Referring to FIGS. 1(a)-1(c) again, FIG. 1(a) shows that all of the toppling members 18 are disposed in their initial upright position; FIG. 1(b) shows the toppling of a first toppling member from its upright position to its inclined position, and the radial arm 22 is rotated anti-clockwise by the magnetic force generated by the interaction of the magnet 24 on the radial arm 22 and the magnetically attractive material 26 on the first toppling member; and FIG. 1(c) showing the toppling of a second toppling member from its upright position to its inclined position, and the radial arm 22 is rotated further anti-clockwise by the magnetic force generated by the interaction of the magnet 24 on the radial arm 22 and the magnetically attractive material 26 on the second toppling member.

Although it has been shown and described that magnets and magnetically attractive materials are used to drive the rotatable vertical shaft to rotate, it is understood that other suitable drive assembly can be provided between the rotatable vertical shaft and the plurality of toppling members, and configured to gather driving forces generated from toppling of the plurality of toppling members and drive the rotatable vertical shaft to rotate. The drive assembly can also be gear assemblies, generators, pressure pumps, etc.

Furthermore, although it has been shown and described that the domino-type torque generator 10 has an annular base member 12 defining a circular path 16, it is understood that the domino-type torque generator 10 can have a path or paths of any possible shapes, such as a spiral path and/or an upwardly sloping path.

Figure 2A:
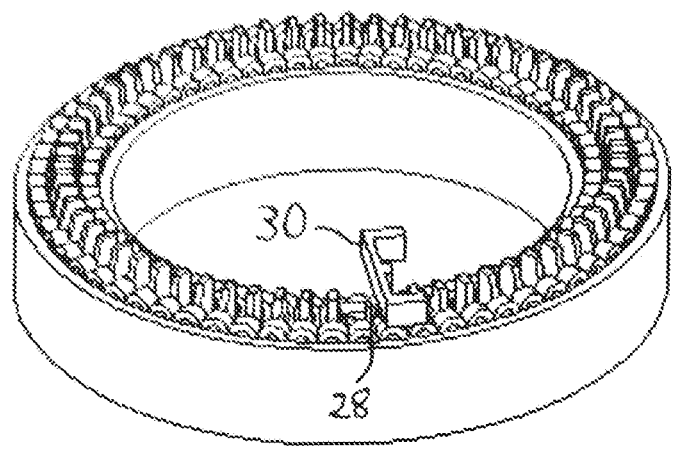
FIG. 2(a) is a perspective view of a domino-type torque generator showing the position of a top weight member provided on a first toppling member when it is in an initial upright position according to the first embodiment of the present disclosure.
Figure 2B:
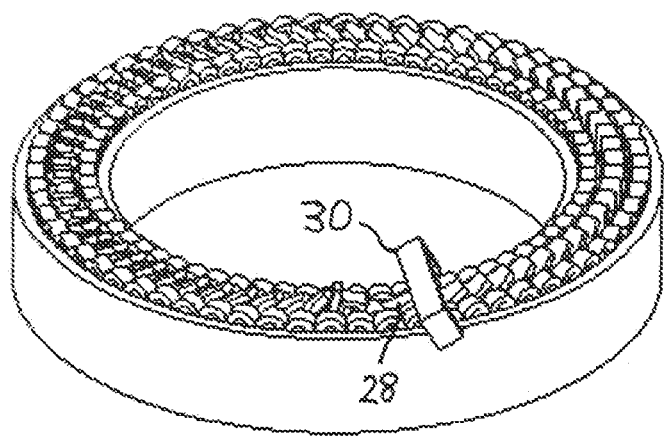
FIG. 2(b) is a perspective view of the domino-type torque generator of FIG. 2(a) showing the position of the top weight member provided on the first toppling member when it is in an inclined position according to the first embodiment of the present disclosure.
Figure 2C:
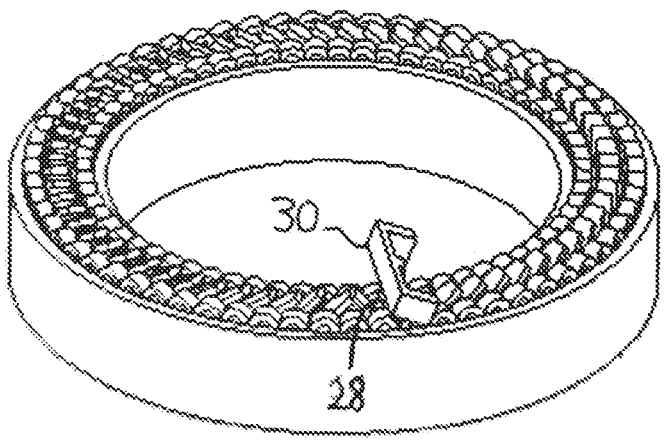
FIG. 2(c) is a perspective view of the domino-type torque generator of FIG. 2(a) showing the position of the top weight member provided on the first toppling member when it pivots from the inclined position back to the upright position according to the first embodiment of the present disclosure.

FIGS. 2(a)-2(c) show an embodiment of a first toppling member 28 that may apply to the first embodiment of the domino-type torque generator 10. A top weight member 30 may be provided on an upper end of the first toppling member 28. The top weight member 30 may extend outwards in a direction in which the first toppling member 28 topples. When the first toppling member 28 is in its upright position, as shown in FIG. 2(a), the first toppling member 28 topples automatically from its upright position to its inclined position because of the weight of the top weight member 30. This top weight member 30 serves as a drive mechanism for driving the first toppling member 28 to topple from its upright position to its inclined position.

When the first toppling member 28 topples from its upright position to its inclined position, the following toppling members topple successively and sequentially from their upright position to their inclined position, as shown in FIG. 2(b), until the last toppling member topples from its upright position to its inclined position. When the last toppling member topples from its upright position to its inclined position, it hits the first toppling member 28. The first toppling member 28 may then pivot from its inclined position back to its upright position, as shown in FIG. 2(c), or to its opposite inclined position, by means of a mechanical switch or an electrical/electronic switch. The toppling members in one cycle are in their upright position, and the toppling members in the other cycle are in their inclined position. It takes two cycles to form a complete cycle.

An electrical/electronic switch can be used to drive the first toppling member to topple. An electrical/electronic switch can also be connected to the last toppling member, and after the last toppling member topples, the electrical/electronic switch can drive the first toppling member from the inclined position back to the upright position.

Figures 3, 4:
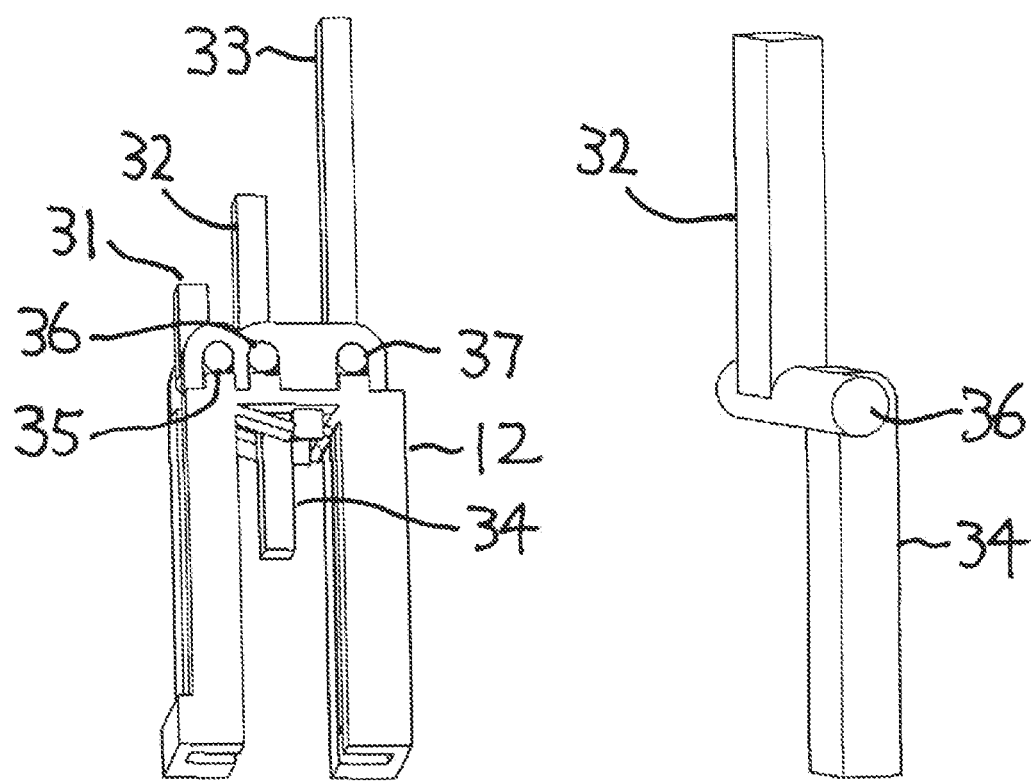
FIG. 3 is a perspective view of a toppling member having a bottom weight member according to an embodiment of the present disclosure.
FIG. 4 is an enlarged view of the toppling member having a bottom weight member according to an embodiment of the present disclosure.

FIGS. 3 and 4 show a toppling member 32 which may be adopted in the first embodiment of the domino-type torque generator 10. A bottom weight member 34 may be attached to and extending downwards from a pivot member or a torque shaft 36 provided at a lower end of the toppling member 32. The bottom weight member 34 has a weight sufficient to automatically drive the toppling member 32 from its inclined position back to its upright position. This bottom weight member 34 serves as a drive mechanism for driving the toppling member 32 to topple from its inclined position back to its upright position.

FIG. 3 also shows three toppling members 31, 32, 33 of different heights and weights, though the number of toppling members can be more than three. The first toppling member 31 is the shortest and smallest toppling member, the following second toppling member 32 is taller and larger than the first toppling member 31, and the following third toppling member 33 is taller and larger than the second toppling member 32. The first, second and third toppling members 31, 32, 33 can be pivotally mounted on the base member 12 through first, second and third torque shafts 35, 36, 37 respectively.

When the first one of the plurality of toppling members 31, the second toppling member 32 and the third toppling member 33 topple successively, the first one of the plurality of toppling members 31, being smaller in size than the second toppling member 32, has a weight sufficient to drive the second toppling member 32 to topple; and the second toppling member 32, being smaller in size than the third toppling member 33, has a weight sufficient to drive the third toppling member 33 to topple. This demonstrates that a smaller toppling member can drive a following larger toppling member to topple.

The torque generated on the third torque shaft 37 is greater than the torque generated on the second torque shaft 36, and the torque generated on the second torque shaft 36 is greater than the torque generated on the first torque shaft 35 when the first one of the plurality of toppling members, the second toppling member and the third toppling member topple successively. This can substantially increase the output torque.

Figure 5A:
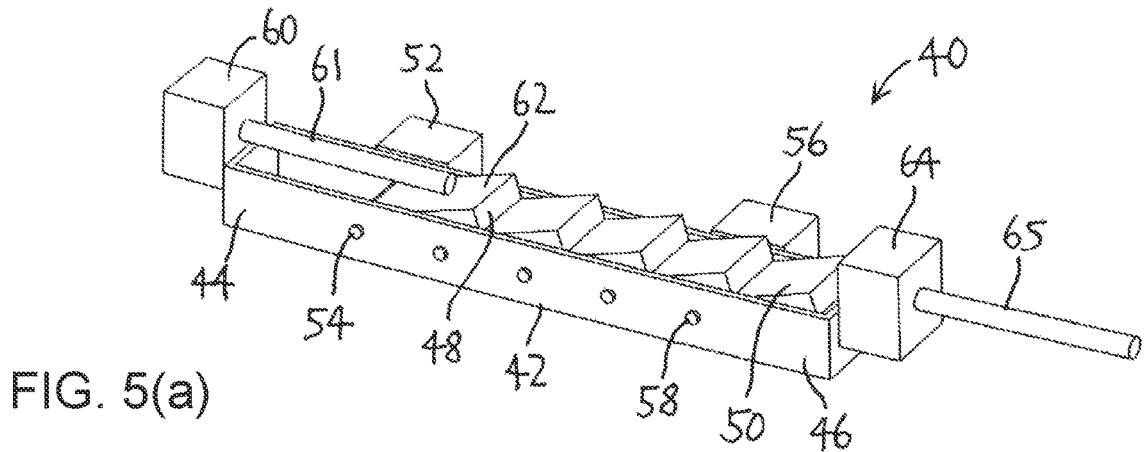
FIG. 5(a) is a perspective view of a domino-type torque generator showing the toppling of the toppling members to their inclined position according to a second embodiment of the present disclosure.
Figure 5B:
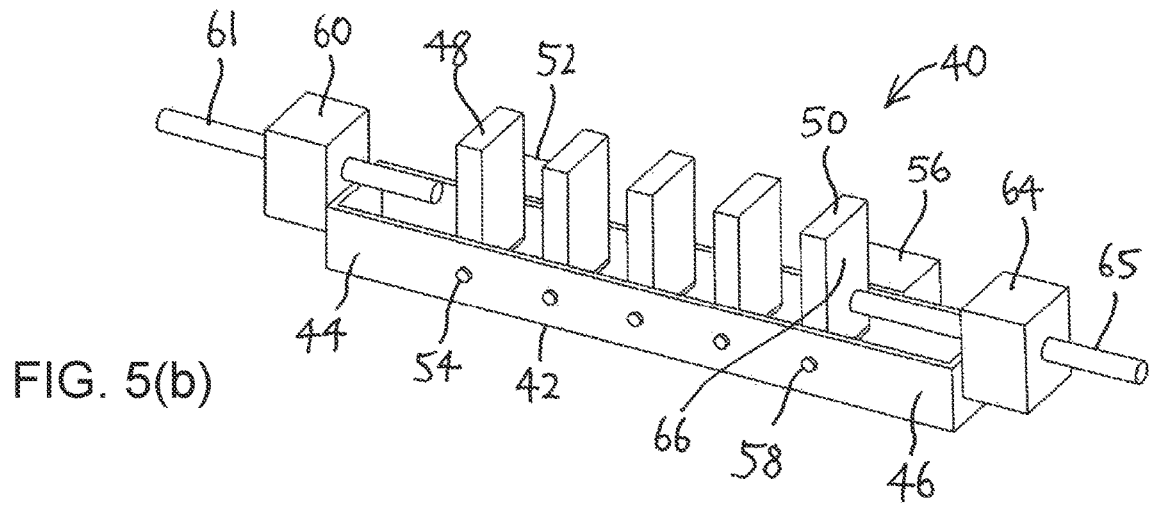
FIG. 5(b) is a perspective view of the domino-type torque generator showing the toppling members in their upright position according to the second embodiment of the present disclosure.
Figure 5C:
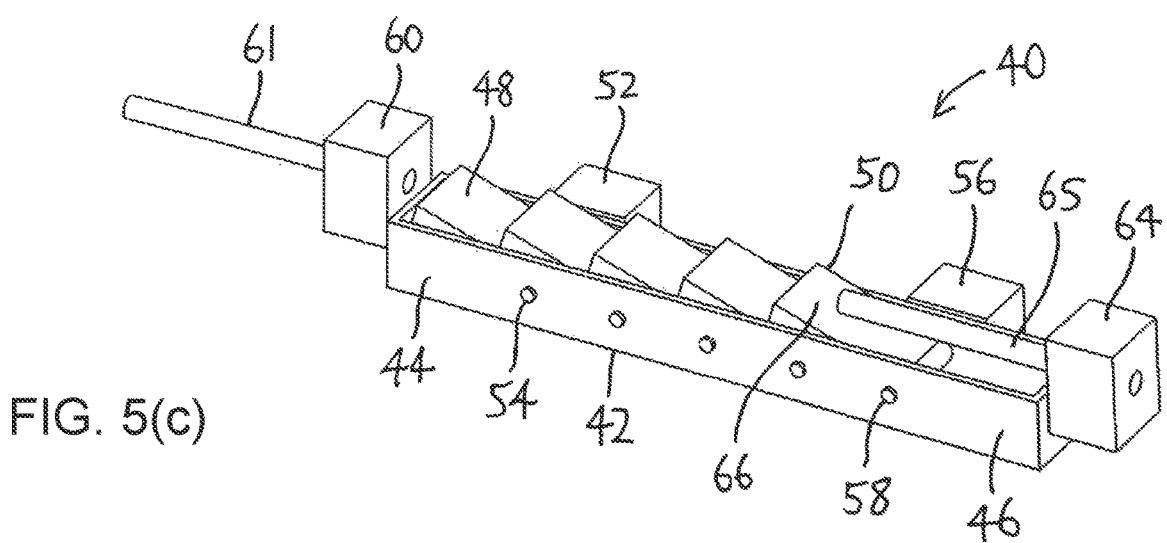
FIG. 5(c) is a perspective view of the domino-type torque generator showing the toppling of the toppling members from their inclined position to their opposite inclined position according to the second embodiment of the present disclosure.

FIGS. 5(a)-5(c) show a second embodiment of the domino-type torque generator of the present disclosure. In this embodiment, the domino-type torque generator 40 may include a base member 42 with a first end 44 and a second end 46. The base member 42 defines a straight path, which is a non-closed path. A first toppling member 48 may be pivotally mounted on the first end 44 of the base member 42, and a last toppling member 50 may be pivotally mounted on the second end 46 of the base member 42.

A first motor 52 may be mounted on one side of the base member 42, and configured to turn the first toppling member 48 in a first direction from its inclined position directly to its opposite inclined position, so that the following toppling members are turned successively and sequentially in the first direction from their inclined position directly to their opposite inclined position, until the last toppling member 50 is turned in the first direction from its inclined position directly to its opposite inclined position, as shown in FIG. 5(a). As used herein, the "opposite inclined position" is a position that is a mirror image of the inclined position about the pivot axis.

A second motor 56 may be mounted on the one side of the base member 42, and configured to turn the last toppling member 50 in an opposite second direction from its opposite inclined position directly to its inclined position, so that the following toppling members are turned successively and sequentially in the second direction from their opposite inclined position directly to their inclined position, until the first toppling member 48 is turned in the second direction from its opposite inclined position directly to its inclined position, as shown in FIG. 5(c).

In another embodiment, there is provided a third motor 60 (or a solenoid), and a first drive member 61 connected to and driven by the third motor 60. The third motor 60 may be mounted at the first end 44 of the base member 42, and facing an outwardly facing surface 62 of the first toppling member 48. The first drive member 61 of the third motor 60 can be configured to push the first toppling member 48 from its back, or top, or side in a first direction from its inclined position directly to its opposite inclined position, so that the following toppling members are pushed successively and sequentially in the first direction from their inclined position directly to their opposite inclined position, until the last toppling member 50 is pushed in the first direction from its inclined position directly to its opposite inclined position, as shown in FIG. 5(a). The first drive member 61 may then be pulled back to its initial position ready for continuous pushing of the toppling members.

A fourth motor 64 (or a solenoid) may be mounted at the second end 46 of the base member 42, and facing an outwardly facing surface 66 of the last toppling member 50. A second drive member 65 may be connected to and driven by the fourth motor 64. The second drive member 65 of the fourth motor 64 can be configured to push the last toppling member 50 from its back, or top, or side in an opposite second direction from its opposite inclined position directly to its inclined position, so that the following toppling members are pushed successively and sequentially in the second direction from their opposite inclined position directly to their inclined position, until the first toppling member 48 is pushed in the second direction from its opposite inclined position directly to its inclined position, as shown in FIG. 5(c). The second drive member 65 may then be pulled back to its initial position ready for continuous pushing of the toppling members.

In the present embodiment, FIGS. 5(a) and 5(c) show that the toppling members can be driven from their inclined position directly to their opposite inclined position, and then from their opposite inclined position directly to their inclined position. FIG. 5(b) shows the toppling members in their upright position between their inclined position and their opposite inclined position.

Although the first and second drive members 61, 65 are shown in FIGS. 5(a)-5(c) as a rod, it is contemplated that any other suitable means, such as a cam (rotating at a desired path), can be used. Furthermore, although it has been shown that the first and second drive members 61, 65 are used to push and topple the toppling members, it is understood that other means may be employed to pull and topple the toppling members.

The first, second, third and fourth motors 52, 56, 60, 64 can serve as drive mechanisms to exert an external force to repeatedly drive the toppling members directly from their inclined position to their opposite inclined position, and directly from their opposite inclined position to their inclined position. It is understood that either the first and second motor 52, 56 or the third and fourth motor 60, 64 can be used. It is also understood that the first and the third motors 52, 60 can turn the toppling members to the direction towards the last toppling member 50, and the second and the fourth motors 56, 64 can turn the toppling members to the direction towards the first toppling member 48.

In addition, it is contemplated by one skilled in the art that the number of toppling members may be any number less than infinity. For example, the number of toppling members in the present embodiment may not necessary be five. One purpose is to use a relatively small force to produce a much greater return.

Figures 6, 7:
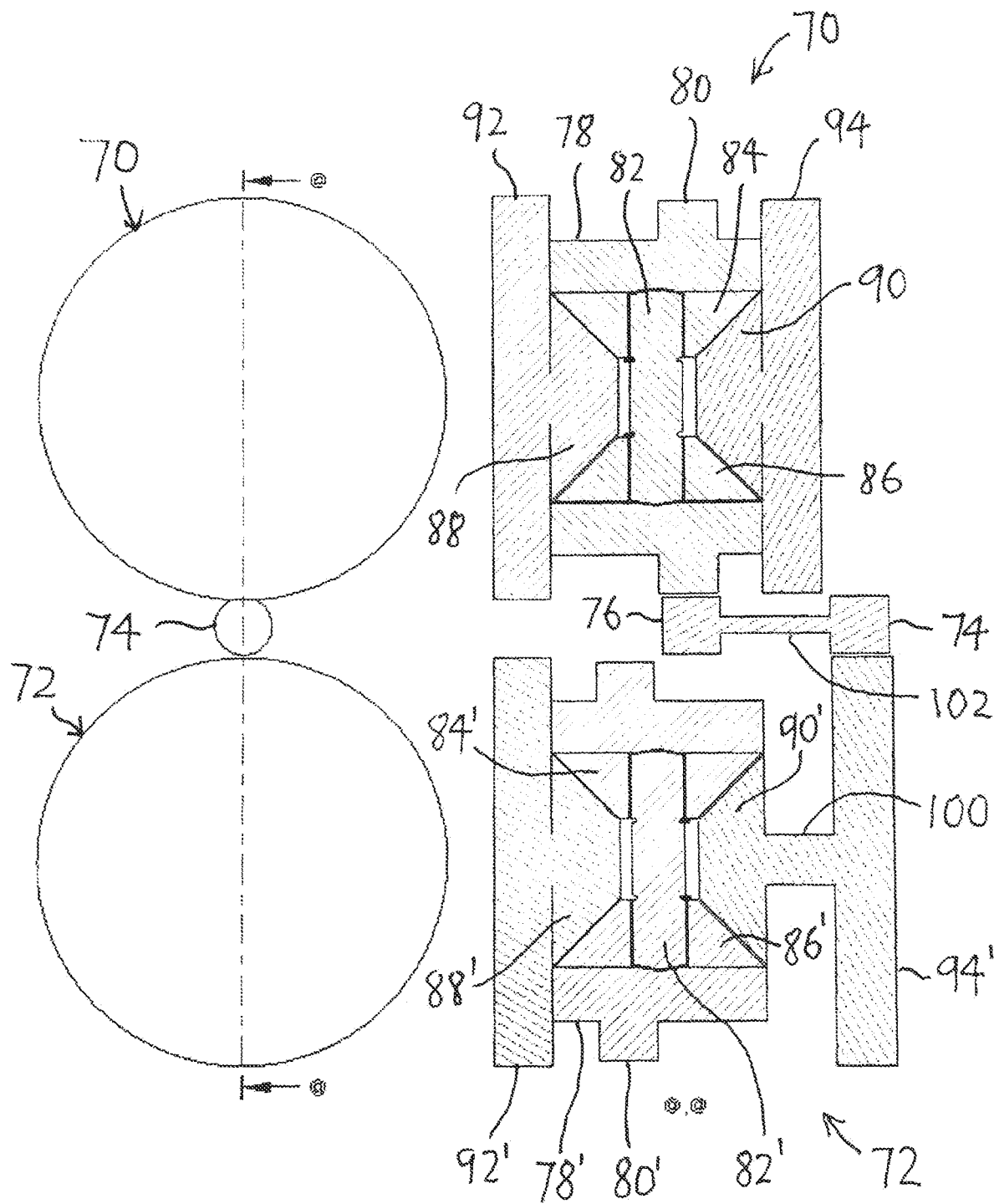
FIG. 6 is a front view of a first differential gear assembly connected with a second differential gear assembly through connection gears according to a first embodiment of the differential gear assembly of the present disclosure.
FIG. 7 is a cross sectional view taken along line @-@ in FIG. 6 of the first differential gear assembly connected with the second differential gear assembly through connection gears according to the first embodiment of the differential gear assembly of the present disclosure.
Figure 8:
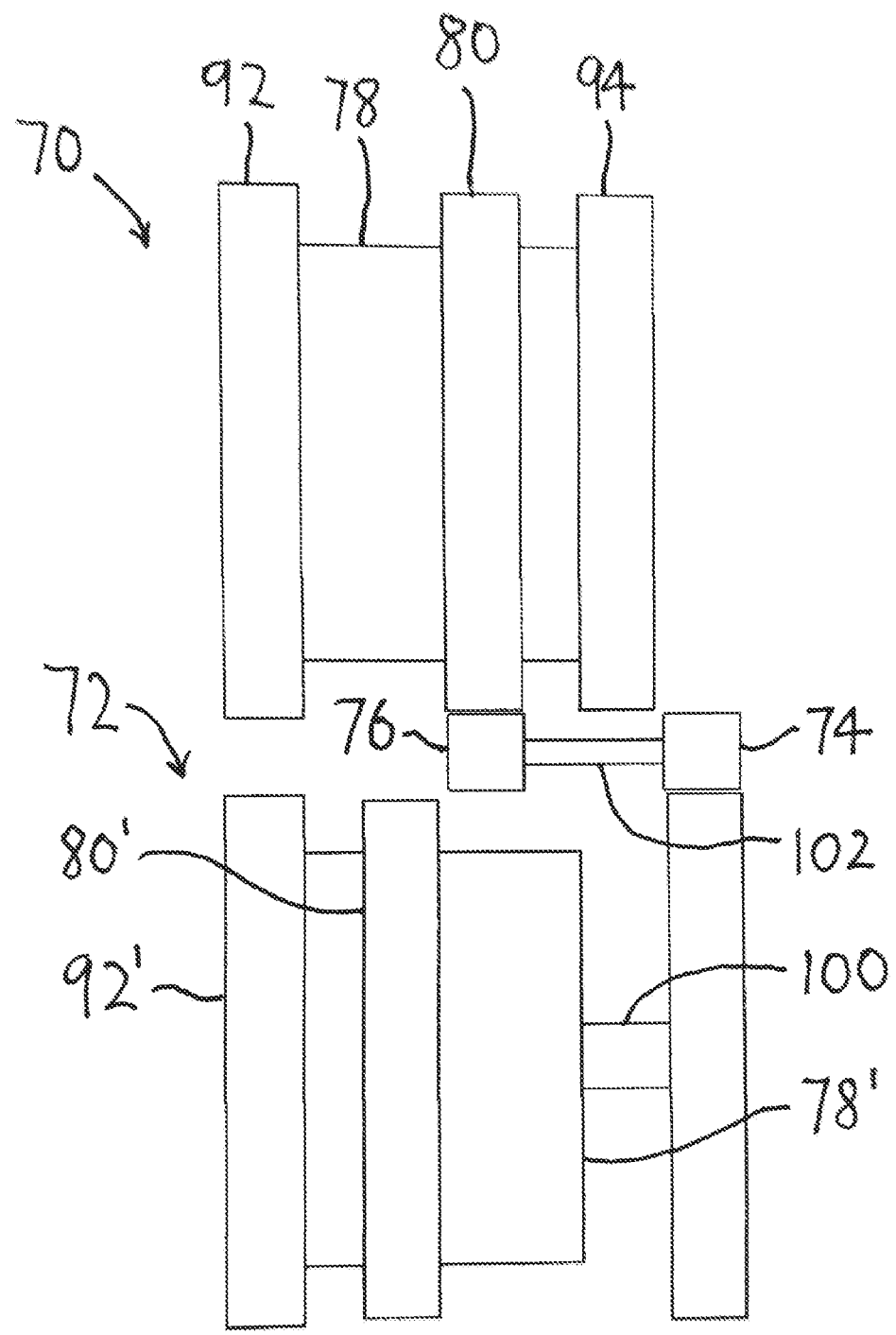
FIG. 8 is a side view of the first differential gear assembly connected with the second differential gear assembly through connection gears of FIG. 6 according to the first embodiment of the differential gear assembly of the present disclosure.

FIGS. 6, 7 and 8 show a first embodiment of a first differential gear assembly 70 connected with a second differential gear assembly 72 through connection gears 74, 76.

The first differential gear assembly 70 may include a first rotating cage 78 having a first side and a second side opposite the first side; a first output gear 80 formed around an outer circumference of the first rotating cage 78, and rotatable with the first rotating cage 78; a first cross shaft 82 mounted inside and across an interior of the first rotating cage 78; a first bevel gear 84 and a second bevel gear 86 rotatably mounted on the first cross shaft 82 (three or more bevel gears can be mounted on the first cross shaft 82, and the first cross shaft 82 can be a straight shaft or in any appropriate shape); a third bevel gear 88 meshed with both the first bevel gear 84 and the second bevel gear 86 at one side of the first cross shaft 82; a fourth bevel gear 90 meshed with both the first bevel gear 84 and the second bevel gear 86 at an opposite side of the first cross shaft 82; a first side gear 92 disposed outside the first rotating cage 78 at the first side thereof, and connected coaxially to and rotatable with the third bevel gear 88; and a second side gear 94 disposed outside the first rotating cage 78 at the second side thereof, and connected coaxially to and rotatable with the fourth bevel gear 90. The first rotating cage 78 (differential carrier)

can be the output, and can be directly or indirectly connected to one of the side gears of the next differential gear assembly. The last rotating cage of the last differential gear assembly can accumulate all the outputs to produce a greater final output.

The second differential gear assembly 72 may include a second rotating cage 78' having a first side and a second side opposite the first side; a second output gear 80' formed around an outer circumference of the second rotating cage 78', and rotatable with the second rotating cage 78'; a second cross shaft 82' mounted inside and across an interior of the second rotating cage 78'; a fifth bevel gear 84' and a sixth bevel gear 86' rotatably mounted on the second cross shaft 82' (three or more bevel gears can be mounted on the second cross shaft 82', and the second cross shaft 82' can be a straight shaft or in any appropriate shape); a seventh bevel gear 88' meshed with both the fifth and sixth bevel gears 84', 86' at one side of the second cross shaft 82'; an eighth bevel gear 90' meshed with both the fifth and sixth bevel gears 84', 86' at an opposite side of the second cross shaft 82'; a third side gear 92' disposed outside the second rotating cage 78' at the first side thereof, and connected coaxially to and rotatable with the seventh bevel gear 88'; a fourth side gear 94' disposed outside the second rotating cage 78' at the second side thereof, and connected coaxially to and rotatable with the eighth bevel gear 90' through a first common shaft 100; a first connection gear 74 meshed with the fourth side gear 94'; and a second connection gear 76 connected coaxially to and rotatable with the first connection gear 74 through a second common shaft 102, the second connection gear 76 being meshed with the first output gear 80 of the first differential gear assembly 70. The torques accumulated by the first differential gear assembly 70 can be transmitted to the second differential gear assembly 72 through the first and second connection gears 74, 76.

Although it has been shown in FIG. 7 that the gears of the first and second differential gear assemblies 70, 72 are friction wheels, it is understood by one skilled in the art that those gears can be toothed gears. For example, the first and second side gears 92, 94, 92', 94' of the first and second differential gear assemblies 70, 72 can be friction wheels or spur gears.

Figure 9:
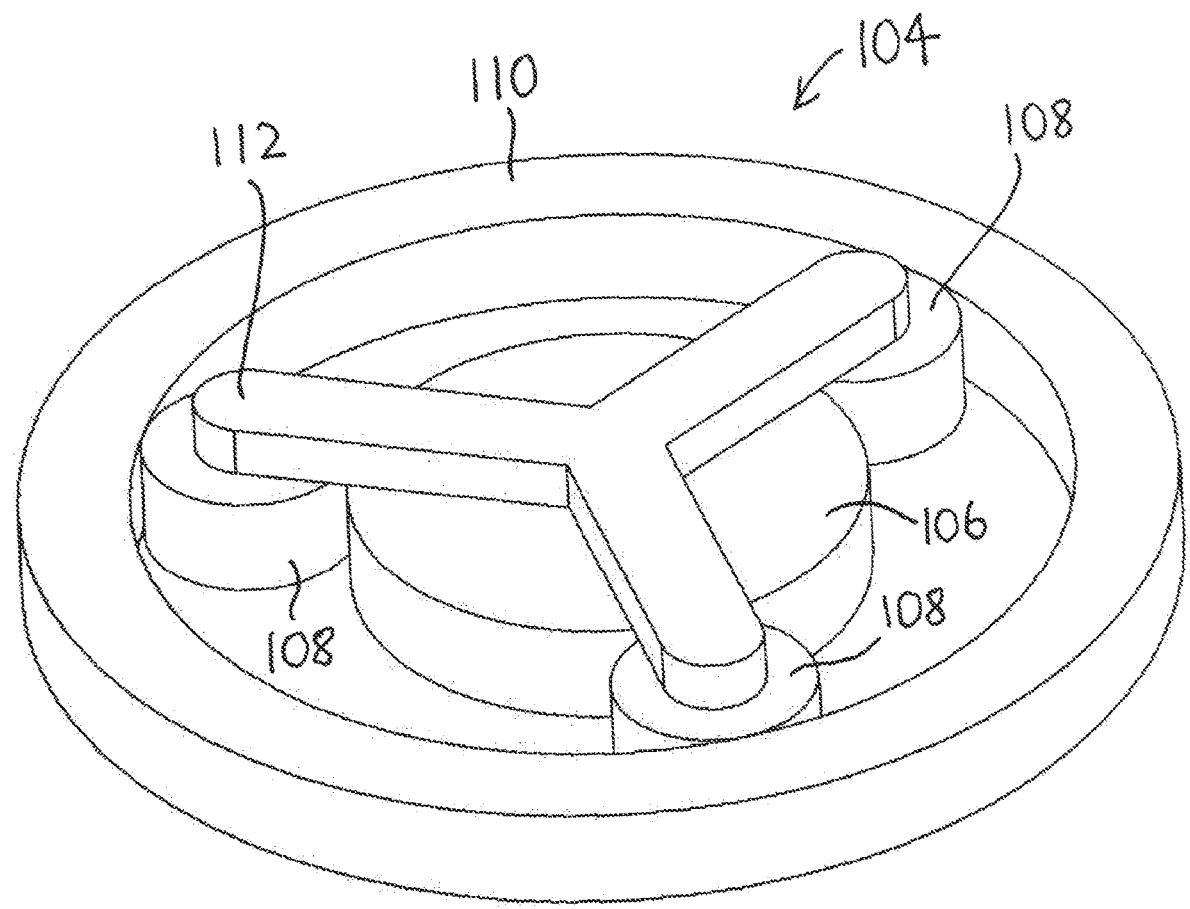
FIG. 9 is an illustrative diagram showing an epicyclic gear train according to a second embodiment of the differential gear assembly of the present disclosure.
Figure 11A:
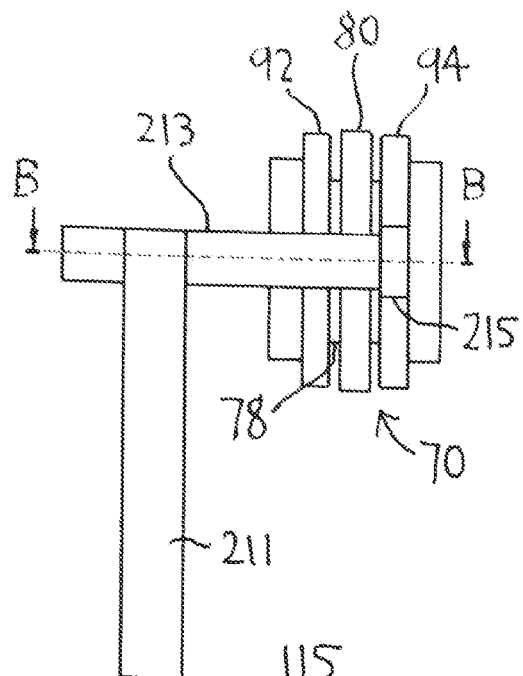
FIG. 11(a) is a side view of two toppling members being connected to a differential gear assembly through two torque shafts and two pinions according to an embodiment of the present disclosure.
Figure 11B:
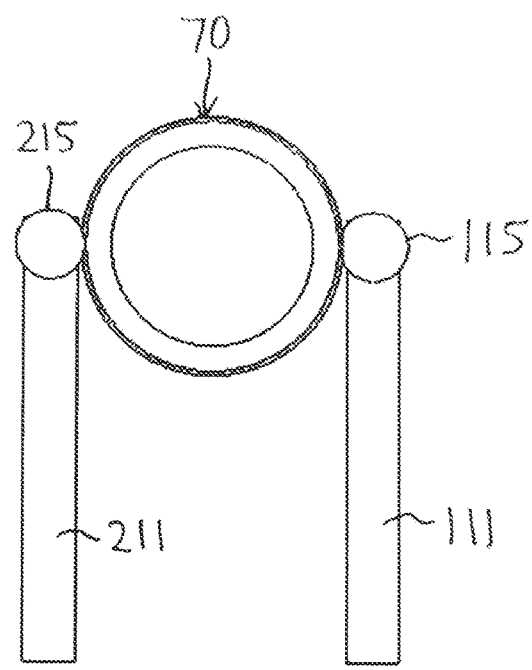
FIG. 11(b) is a front view of the two toppling members being connected to the differential gear assembly through two torque shafts and two pinions according to an embodiment of the present disclosure.
Figure 11C:
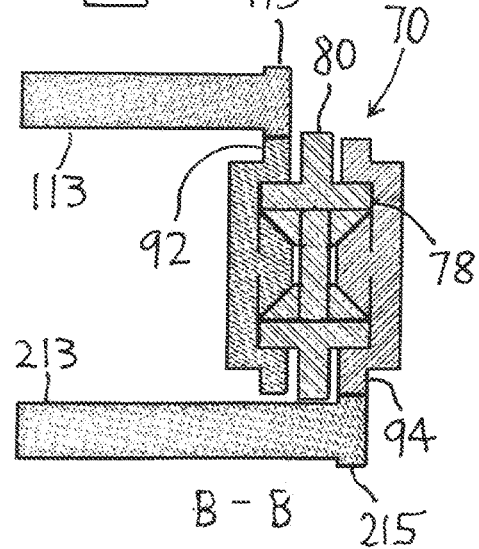
FIG. 11(c) is a cross sectional view, taken along line B-B in FIG. 11(a), of the two toppling members being connected to the differential gear assembly through two torque shafts and two pinions according to an embodiment of the present disclosure.
Figure 11D:
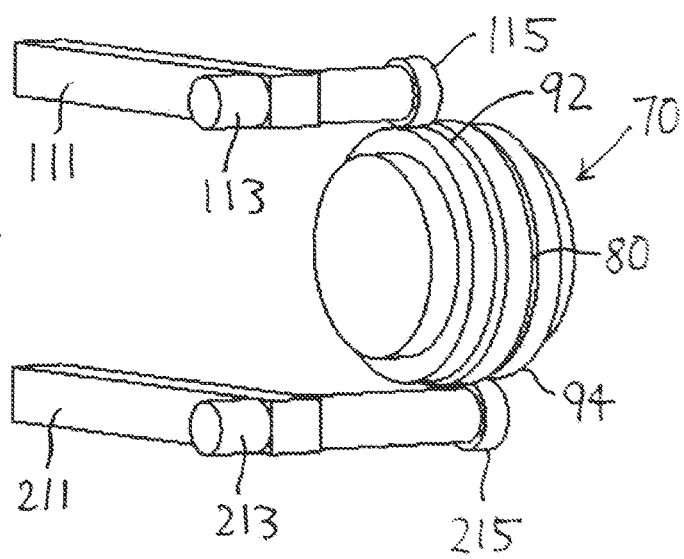
FIG. 11(d) is a perspective view of the two toppling members being connected to the differential gear assembly through two torque shafts and two pinions according to an embodiment of the present disclosure.

FIG. 9 shows a second embodiment of the differential gear assembly of the present disclosure. The differential gear assembly may be in the form of an epicyclic gear train. Any one of the differential gear assemblies mentioned in the first embodiment can be replaced by an epicyclic gear train 104. The epicyclic gear train 104 may include a central sun gear 106, a plurality of planet gears 108 meshed with and rotatable around the central sun gear 106, an outer ring gear 110 meshed with the plurality of planet gears 108, and a carrier 112 (or arm) on which the plurality of planet gears 108 are rotatably mounted, whereby external torques applied to the central sun gear 106 and the outer ring gear 110 can be accumulated and output through the carrier 112. For the epicyclic gear train, the carrier 112 (or arm) is the output. The external or upper level torques can be applied to the central sun gear 106 and the outer ring gear 110 (or internal gear).

FIGS. 10(*a*)-(*c*) show different views of a first toppling member 111 being connected to a first torque shaft 113 having a first pinion 115. FIGS. 11(*a*)-(*d*) show different views of first and second toppling members 111, 211 being connected to the first differential gear assembly 70 through first and second torque shafts 113, 213 and first and second pinions 115, 215 respectively.

In the embodiment shown in FIGS. 10(*a*)-(*c*), the first torque shaft 113 may be fixedly connected to and extending transversely through a lower end portion of each toppling member 111, whereby toppling of each toppling member 111 can generate a torque on the first torque shaft 113. The first torque shaft 113 defines a pivot axis X about which the toppling member 111 pivots. The first torque shaft 113 may have a first section 141 extending from a first side of the lower end portion of the toppling member 111, and an elongated second section 143 extending from an opposite second side of the lower end portion of the toppling member 111. The first section 141 and the elongated second section 143 can be pivotably mounted on the base member 12. The first pinion 115 may be fixedly mounted at a free end of the elongated second section 143 of the torque shaft 113 of the toppling member 111.

A plurality of differential gear assemblies 70, 72 may be connected directly or indirectly to the first and second pinions 115, 215 of the first and second torque shafts 113, 213 of selected ones the plurality of toppling members 111, 211, and served as accumulators to accumulate torques generating on the torque shafts 113, 213 of the selected ones of the plurality of toppling members 111, 211. As used herein, the term "accumulator" refers to a gear assembly, such as a differential gear assembly or an epicyclic gear train, that can accumulate input torques and output an accumulated torque through the gear assembly.

In the embodiment in FIGS. 11(*a*)-(*d*), the first differential gear assembly 70 may be connected to the first and second pinions 115, 215 of the first and second torque shafts 113, 213 of two selected toppling members 111, 211. The first differential gear assembly 70 may include the first side gear 92, the second side gear 94, and the first output gear 80 of the first rotating cage 78 for torque output. The first side gear 92 of the first differential gear assembly 70 can be engageable with the first pinion 115 of the first torque shaft 113 of the first selected toppling member 111, and the second side gear 94 of the first differential gear assembly 70 can be engageable with the second pinion 215 of the second torque shaft 213 of the second selected toppling member 211. The first and second side gears 92, 94 of the first differential gear assembly 70 can be rotatably connected to the first rotating cage 78. In fact, one of the first and second side gears 92, 94 of the first differential gear assembly 70 is sufficient to drive the first rotating cage 78, and the other one of the first and second side gears 92, 94 of the first differential gear assembly 70 can be at a standstill stage or can be driven at any speed.

Referring to FIG. 7, the second differential gear assembly 72 may include the third side gear 92', the fourth side gear 94', and the second output gear 80' of the second rotating cage 78' for torque output. One of the third and fourth side gears 92', 94' of the second differential gear assembly 72 can be engageable directly or indirectly with the first output gear 80 of the first rotating cage 78 of the first differential gear assembly 70. The third and fourth side gears 92', 94' of the second differential gear assembly 72 can be rotatably connected to the second rotating cage 78'. In fact, one of the third and fourth side gears 92', 94' of the second differential gear assembly 72 is sufficient to drive the second rotating cage 78', and the other one of the third and fourth side gears 92', 94' of the second differential gear assembly 72 can be at a standstill stage or can be driven at any speed.

Torques generated by the toppling of the first and second selected toppling members 111, 211 can be transmitted to the first and second side gears 92, 94 of the first differential gear assembly 70 through the first and second torque shafts 113, 213 and the first and second pinions 115, 215 respectively, accumulated by the first differential gear assembly 70, and output through the first output gear 80 of the first rotating cage 78 of the first differential gear assembly 70. The accumulated torque output through the first output gear 80 of the first rotating cage 78 of the first differential gear assembly 70 can be transmitted to one of the first and second side gears 92', 94' of the second differential gear assembly 72. Torques transmitted to the first and second side gears 92', 94' of the second differential gear assembly 72 can be accumulated by the second differential gear assembly 72, and output through the second output gear 80' of the second rotating cage 78' of the second differential gear assembly 72, until a final accumulated torque is output through a last rotating cage of a last differential gear assembly.

Figure 12:
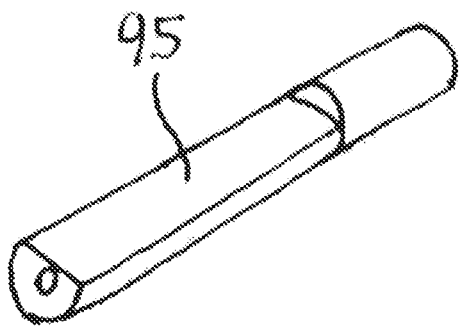
FIG. 12 is a perspective view of a torque shaft in the form of a D-shaft according to an embodiment of the present disclosure.

FIG. 12 shows a torque shaft that takes the form of a D-shaft 95. It is known that the D-shaft 95 is a cylindrical shaft that has a chord of the circular cross section machined off. The D-shaft 95 can be fixedly engaged with a corresponding D-shaped opening formed in the toppling member. This can prevent relative rotation between the torque shaft and the toppling member. Other polygonal shaft can be used.

Figure 13:
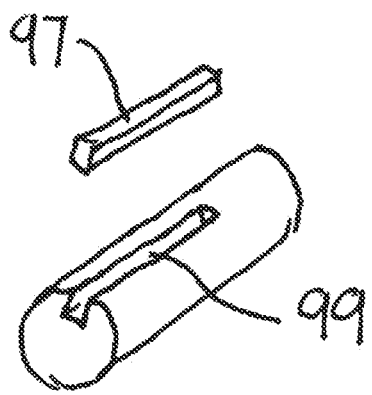
FIG. 13 is a perspective view of a torque shaft formed with a keyway according to an embodiment of the present disclosure.

FIG. 13 shows a torque shaft formed with a keyway 99. This keyway 99 can be fixedly engaged with a matching key 97 formed in the toppling member. This can also prevent relative rotation between the torque shaft and the toppling member.

FIGS. 14(a)-(c) show a third embodiment of the domino-type torque generator of the present disclosure. In this embodiment, the domino-type torque generator 120 may include a semi-circular base member 122, and a plurality of toppling members 124 pivotally connected to the base member 122. As best illustrated in FIG. 15, each of the plurality of toppling members 124 may include a first pivot member 126 pivotably connected to the base member 122, the first torque shaft or pivot member 126 having a first half section 128 and a second half section 130; a first toppling portion 132 extending laterally and outwardly from the first half section 128 of the first pivot member 126; and a second toppling portion 134 extending laterally and outwardly from the second half section 130 of the first pivot member 126. Each of the plurality of toppling members 124 may be V-shaped as viewed from one side.

The first and second toppling portions 132, 134 may be oriented at a first angle with respect to each other about the first pivot member 126, so that when the first toppling portion 132 pivots to its upright position, the second toppling portion 134 pivots at the same time to its inclined position; and when the first toppling portion 132 pivots to its inclined position, the second toppling portion 134 pivots at the same time to its upright position.

The domino-type torque generator 120 may further include a first switch 140 and a second switch 140' having a same structure as the first switch 140. The first switch 140 can be pivotally connected to a first end 142 of the base member 122, and the second switch 140' can be pivotally connected to a second end 144 of the base member 122.

Figure 18:
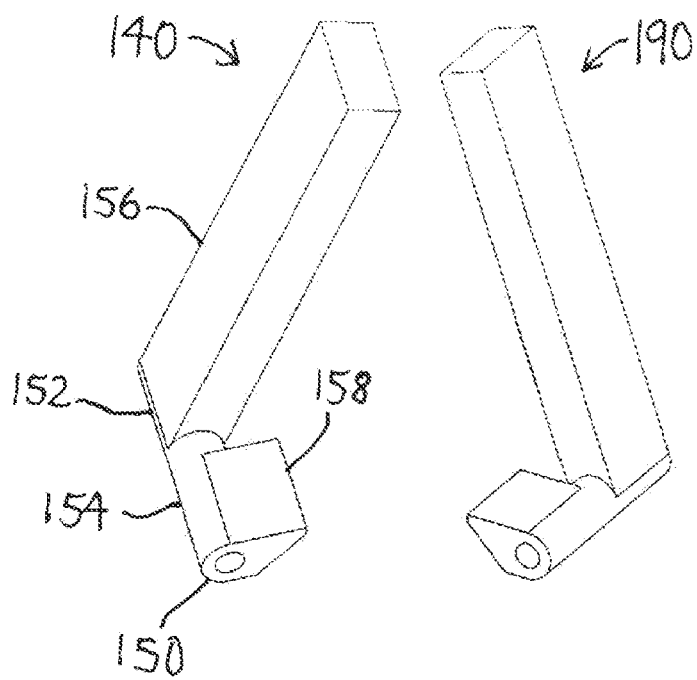
FIG. 18 is a perspective view of the two toppling members adopted in the third, fourth and fifth embodiments of the present disclosure.

Referring to FIG. 18, each of the first switch 140 and the second switch 140' may include a second torque shaft or pivot member 150 pivotably connected to the base member 122, the second pivot member 150 having a first half section 152 and a second half section 154; an elongated switch portion 156 extending laterally and outwardly from the first half section 152 of the second pivot member 150, and moveable between an up and inclined position and a down position, the elongated switch portion 156 having a length longer than the length of the plurality of toppling members 124, and a weight sufficient to topple a following toppling member; and a shortened switch portion 158 extending laterally and outwardly from the second half section 154 of the second pivot member 150, and moveable between an up and inclined position and a down position, the shortened switch portion 158 having a length shorter than the length of the plurality of toppling members 124.

The elongated switch portion 156 and the shortened switch portion 158 may be oriented at a second angle with respect to each other about the second pivot member 150, so that when the shortened switch portion 158 pivots from its up and inclined position to its down position, the elongated switch portion 156 pivots from its up and inclined position to its down position; and when the shortened switch portion 158 pivots from its down position to its up and inclined position, the elongated switch portion 156 pivots from its down position to its up and inclined position.

The plurality of toppling members 124, the first switch 140 and the second switch 140' may be so arranged that when the elongate switch portion 156 of the first switch 140 pivots from its up and inclined position to its down position by means of its own weight, the elongate switch portion 156 of the first switch 140 hits the first toppling portion 132 of the first toppling member 124', so that the first toppling portion 132 of the first toppling member 124' topples from its upright position to its inclined position, the first toppling portions 132 of the following toppling members 124 topple successively and sequentially from their upright position to their inclined position, until the first toppling portion 132 of the last toppling member 124" topples from its upright position to its inclined position, thereby producing a domino effect and generating a torque, as shown in FIG. 14(a). When the first toppling portions 132 of the plurality of toppling members 124, 124', 124" topple from their upright position to their inclined position, the second toppling portions 134 of the plurality of toppling members 124, 124', 124" pivot at the same time from their inclined position to their upright position. When the first toppling portion 132 of the last toppling member 124" topples from its upright position to its inclined position, the first toppling portion 132 of the last toppling member 124" hits the shortened switch portion 158' of the second switch 140' so that the shortened switch portion 158' of the second switch 140' pivots from its up and inclined position to its down position, and at the same time the elongated switch portion 156' of the second switch 140' pivots from its up and inclined position to its down position. When the elongated switch portion 156' of the second switch 140' pivots from its up and inclined position to its down position, the elongated switch portion 156' of the second switch 140' hits the second toppling portion 134 of the last toppling member 124" so that the second toppling portion 134 of the last toppling member 124" topples from its upright position to its down position, the second toppling portions 134 of the following toppling members 124 topple successively and sequentially from their upright position to their down position, until the second toppling portion 134 of the first toppling member 124' topples from its upright position to its down position, as shown in FIG. 14(b).

The toppling of the second toppling portion 134 of the first toppling member 124' may trigger an electrical or electronic switch (not shown) that drives the elongated switch portion 156 of the first switch 140 to pivot from its down position back to its up and inclined position, as shown in FIG. 14(c) where the elongated switch portion 156 of the first switch 140 can topple again from its up and inclined position to its down position by means of its own weight, thereby continuously toppling the plurality of toppling members 124, 124', 124" along the path, and continuously generating torques.

Figure 16A:
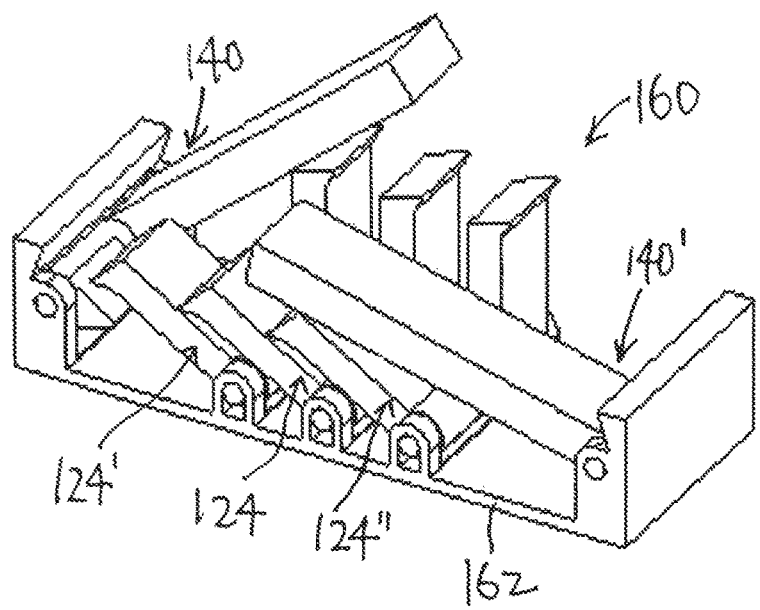
FIG. 16(a) is a perspective view of a domino-type torque generator showing that the toppling portions on one side of the toppling members are in their inclined position, and the toppling portions on the other side of the toppling members are in their upright position according to a fourth embodiment of the present disclosure.
Figure 16B:
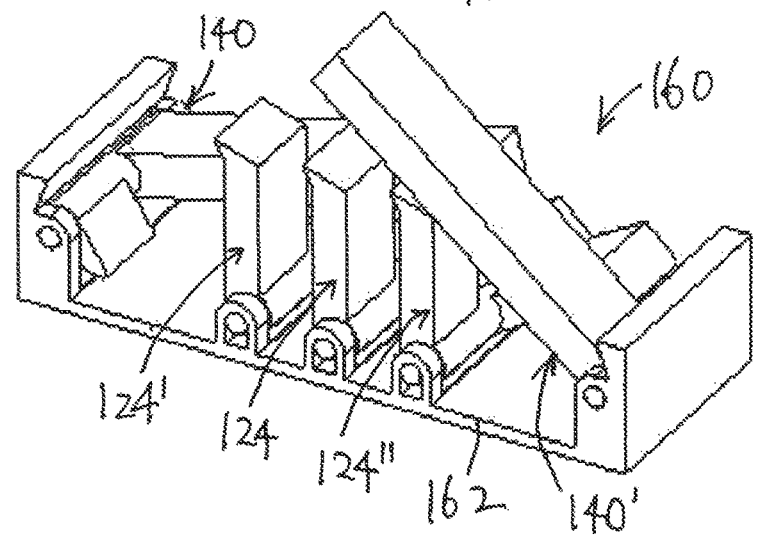
FIG. 16(b) is a perspective view of the domino-type torque generator of FIG. 16(a) showing that the toppling portions on one side of the toppling members are in their upright position, and the toppling portions on the other side of the toppling members are in their inclined position according to the fourth embodiment of the present disclosure.
Figure 16C:
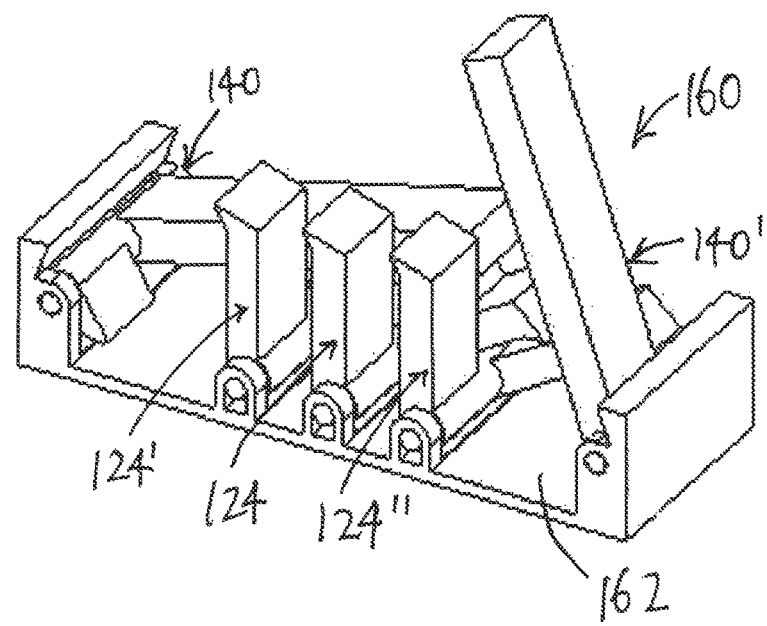
FIG. 16(c) is a perspective view of the domino-type torque generator of FIG. 16(a) showing upward pivoting of an elongated switch portion of a switch according to the fourth embodiment of the present disclosure.

FIGS. 16(a)-(c) show a fourth embodiment of the domino-type torque generator 160. The domino-type torque generator 160 of this embodiment is similar to the third embodiment shown in FIGS. 14(a)-(c), except the base member 162 is rectangular in shape, and the path is a linear path. There are only three toppling members 124, 124' and 124".

Figure 17:
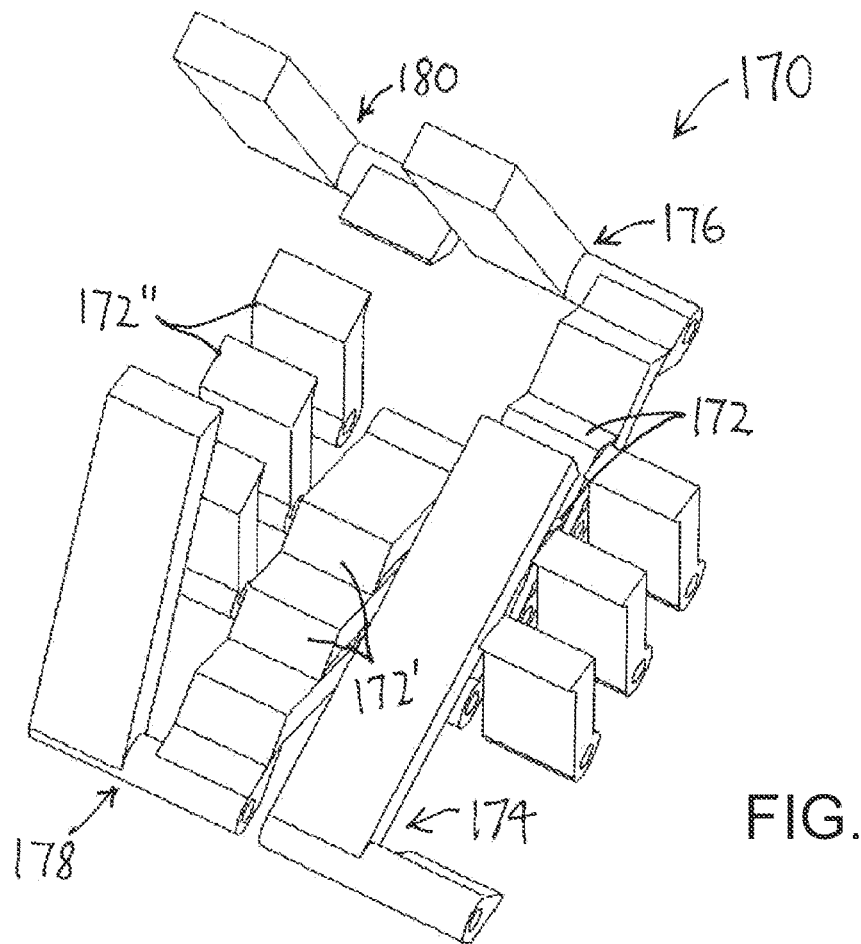
FIG. 17 is a perspective view of a domino-type torque generator according to a fifth embodiment of the present disclosure.

FIG. 17 shows a fifth embodiment of the domino-type torque generator 170. The domino-type torque generator 170 of this embodiment is similar to the fourth embodiment shown in FIGS. 16(a)-(c), except that each plurality of toppling members 172, 172', 172" has only one toppling portion. In this embodiment, a first switch 174 first pivots downwards and drives the first plurality of toppling members 172 to topple, which in turn drives a second switch 176 to pivot downwards. When the second switch 176 pivots downwards, it hits and drives the second plurality of toppling members 172' to topple, which in turn hits the third switch 178. When the second plurality of toppling members 172' hits the third switch 178, the third switch 178 pivots downwards, which in turn hits and drives the third plurality of toppling members 172" to topple. When the third plurality of toppling members 172" topples, it hits and pivots a fourth switch 180 downwards. The toppling of the plurality of toppling members 172, 172', 172" repeats, and torques can be generated continuously. The first and third switches 174, 178 may have the same structure as that of the switch 140 shown in FIG. 18; and the second and fourth switches 176, 180 may have the same structure as that of the switch 190 shown in FIG. 18.

Figure 19:
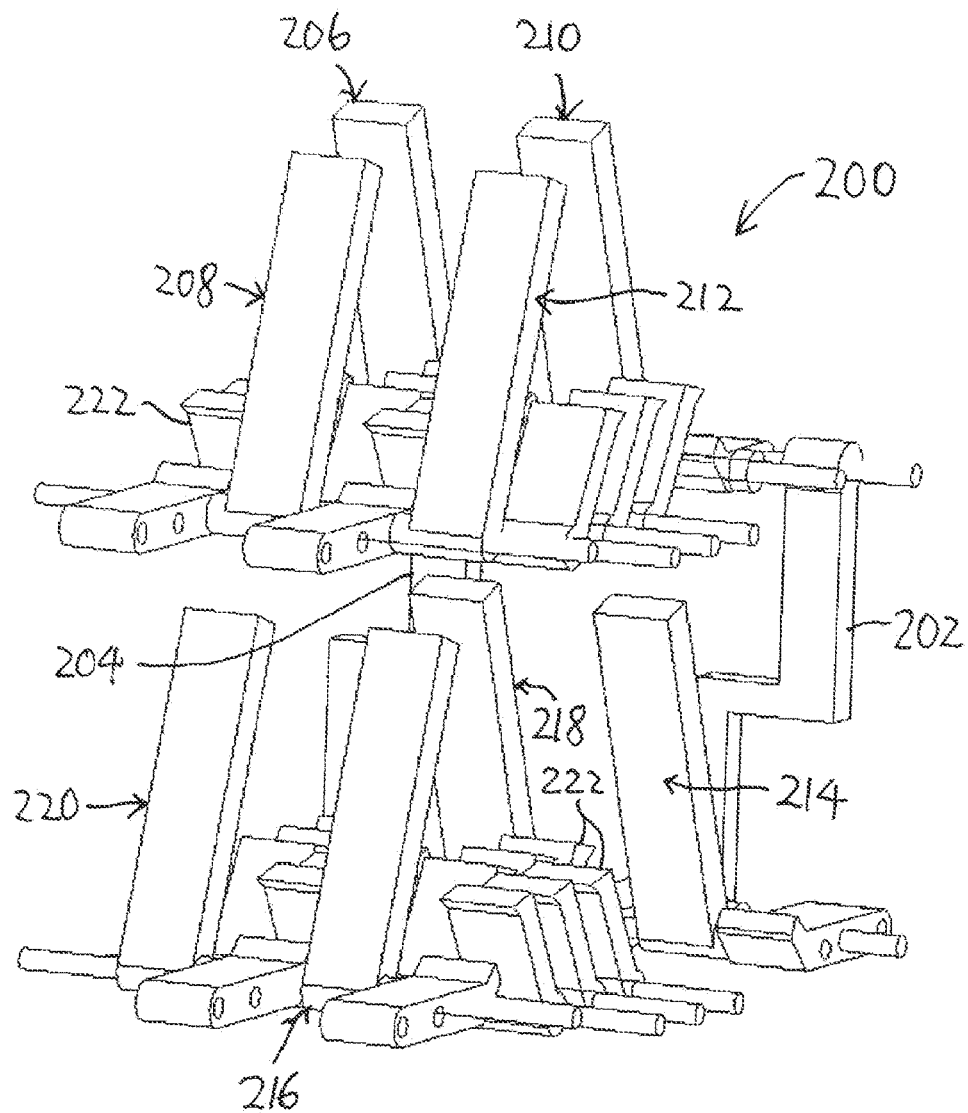
FIG. 19 is a perspective view of a domino-type torque generator according to a sixth embodiment of the present disclosure.

FIG. 19 shows a sixth embodiment of the domino-type torque generator 200. In this embodiment, the path may have an upper level and a lower level. The domino-type torque generator 200 may include a first plurality of toppling members 222 disposed on the upper level; a second plurality of toppling members 222 disposed on the lower level; a first link 204 having an upper end connected to a first switch 206 of the first plurality of toppling members on the upper level, and a lower end connected to a last switch 220 of the second plurality of toppling members on the lower level; and a second link 202 having an upper end connected to a last switch 212 of the first plurality of toppling members on the upper level, and a lower end connected to a first switch 214 of the second plurality of toppling members on the lower level.

Figure 20:
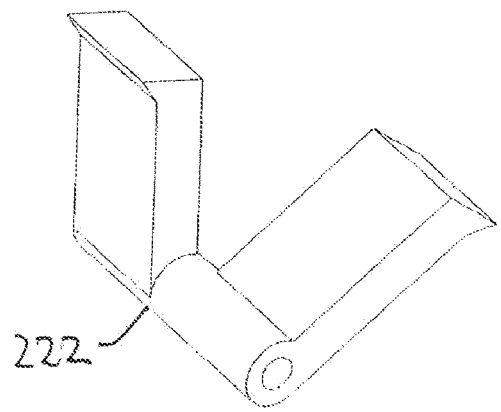
FIG. 20 is a perspective view of a toppling member adopted in the sixth embodiment of the present disclosure.

In this embodiment, the first switch 206 on the upper level pivots downwards, which in turn drives a second switch 208 to pivot downwards (through the plurality of toppling members 222), which in turn drives a third switch 210 to pivot downwards, which in turn drives the last switch 212 on the upper level to pivot downwards. When the last switch 212 on the upper level pivots downwards, it drives the second link 202 to move upwards, which in turn drives the first switch 214 to pivot downwards, which in turn drives a second switch 216 to pivot downwards, which in turn drives a third switch 218 to pivot downwards, which in turn drives the last switch 220 on the lower level to pivot downwards. When the last switch 220 on the lower level pivots downwards, it drives the first link 204 to move upwards, which in turn drives the first switch 206 on the upper level to pivot downwards. The toppling of the plurality of toppling members 222 repeats, and torques can be generated continuously. FIG. 20 is an enlarged view of the toppling member 222.

Figure 21A:
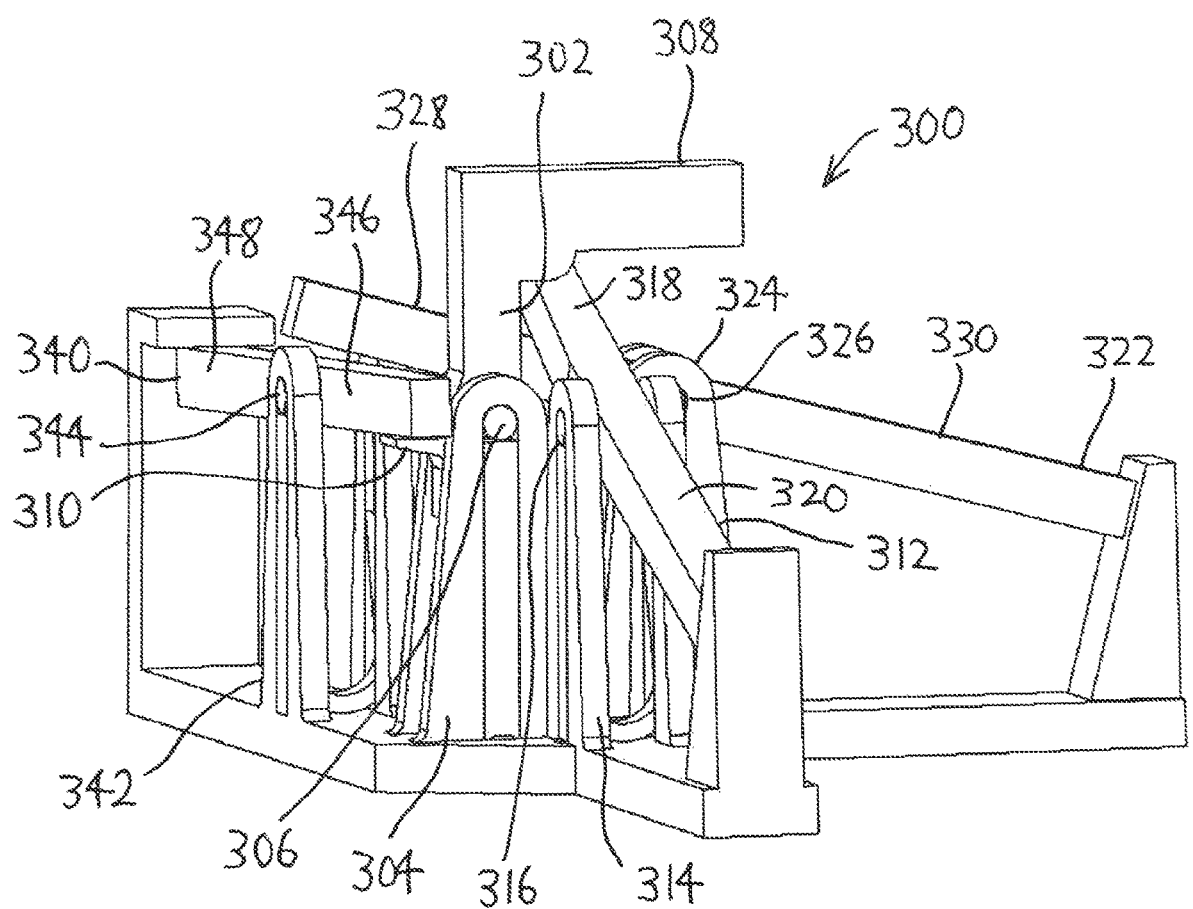
FIG. 21(a) is a perspective view of a domino-type torque generator in an initial stage according to a seventh embodiment of the present disclosure.
Figure 21B:
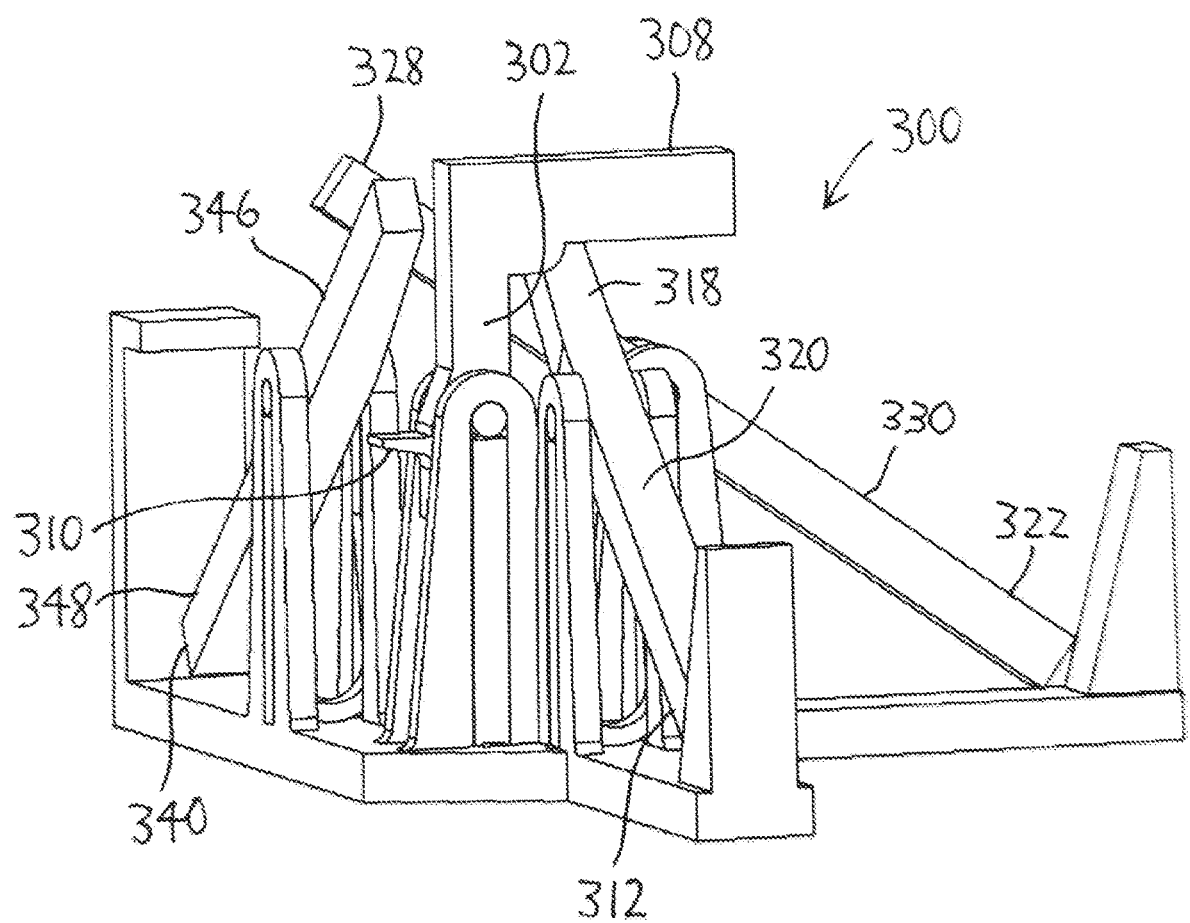
FIG. 21(b) is a perspective view of the domino-type torque generator of FIG. 21(a) in a first stage according to the seventh embodiment of the present disclosure.
Figure 21C:
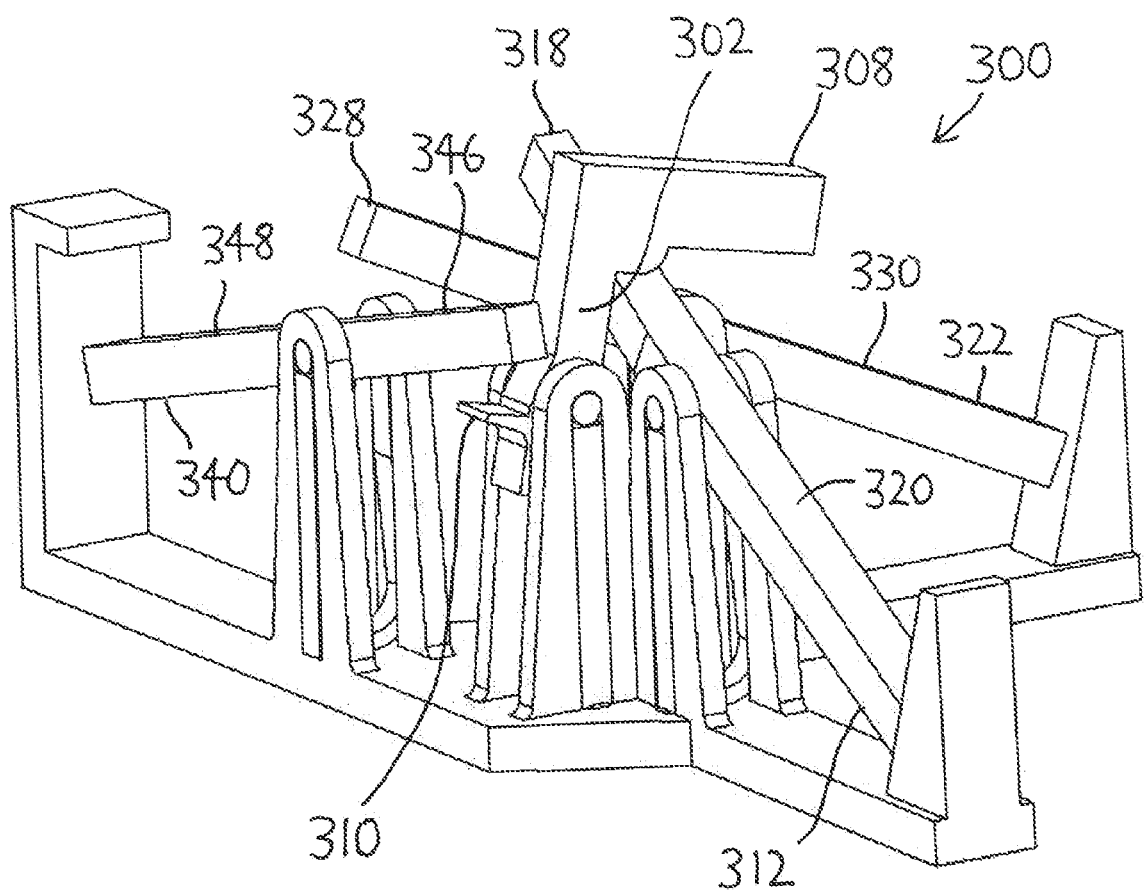
FIG. 21(c) is a perspective view of the domino-type torque generator of FIG. 21(a) in a second stage according to the seventh embodiment of the present disclosure.

FIGS. 21(a)-(c) show a seventh embodiment of the domino-type torque generator 300. In this embodiment, the path is a path with sharp turns. The domino-type torque generator 300 may include a vertical bar 302, a switch member 310, a first bar 308, a second bar 312, a third bar 322, a fourth or last bar 340. The vertical bar 302 may be pivotally connected to an upper end of a first upright support 304 at a first pivot point 306 located at a lower end of the vertical bar 302. The first bar 308 may be extending from an upper end of the vertical bar 302 in a first direction, and the first bar 308 can be pivotable about the first pivot point 306 between an up position and a down position. The switch member 310 may be extending from the lower end of the vertical bar 302 in a second direction opposite the first direction. The switch member 310 can be pivotable about the first pivot point 306 between an up position and a down position. The first bar 308 is longer than the switch member 310 so that the first bar 308 topples from its up position to its down position by its own weight when the switch member 310 is disengaged.

The second bar 312 may be pivotally connected to an upper end of a second upright support 314 at a second pivot point 316 offset from a center of the second bar 312, and forming a short portion 318 and a long portion 320 on opposite sides of the second pivot point 316. The short portion 318 of the second bar 312 is urging upwards against an underside of the first bar 308 due to a downward force of the long portion 320 of the second bar 312. The short portion 318 of the second bar 312 can be pivotable between an up position and a down position.

The third bar 322 may be pivotally connected to an upper end of a third upright support 324 at a third pivot point 326 offset from a center of the third bar 322, and forming a short portion 328 and a long portion 330 on opposite sides of the third pivot point 326. The short portion 328 of the third bar 322 is urging upwards against an underside of the short portion 318 of the second bar 312 due to a downward force of the long portion 330 of the third bar 322. The short portion 328 of the third bar 322 can be pivotable between an up position and a down position.

Finally, the fourth or last bar 340 may be pivotally connected to an upper end of a fourth upright support 342 at a fourth pivot point 344 offset from a center of the last bar 340, and forming a short portion 346 and a long portion 348 on opposite sides of the fourth pivot point 344. The short portion 346 of the last bar 340 is urging upwards against an underside of the short portion 328 of the third bar 322 due to a downward force of the long portion 348 of the last bar 340. The short portion 346 of the last bar 340 can be pivotable between an up position where the short portion 346 of the last bar 340 is disengaged from the switch member 310, and a down position where the short portion 346 of the last bar 340 is engaged with and pressing on an upper side of the switch member 310.

When the first bar 308 topples from its up position to its down position by its own weight, the first bar 308 pushes the short portions 318, 328 of the second and the third bars 312, 322 to pivot downwards from their up position to their down position, until the short portion 346 of the last bar 340 pivots downwards from its up position to its down position. When the last bar 340 pivots downwards from its up position to its down position, the short portion 346 of the last bar 340 engages with the switch member 310 and presses the switch member 310 downwards, thereby pivoting the first bar 308 from its down position to its up position.

Finally, when the first bar 308 pivots from its down position to its up position, the short portions 318, 328 of the second and the third bars 312, 322 pivot upwards from their down position to their up position due to downward force of the long portions 320, 330 of the second and the third bars 312, 322, until the short portion 346 of the last bar 340 pivots upwards from its down position to its up position and disengages from the switch member 310 to allow the first bar 308 to topple again by its own weight, thereby continuously pivoting the first, second, third and last bars 308, 312, 322, 340, and continuously generating torques. The pivot points 306, 316, 326, 344 can be torque shafts for generating torques.

Figures 22A, 22B:
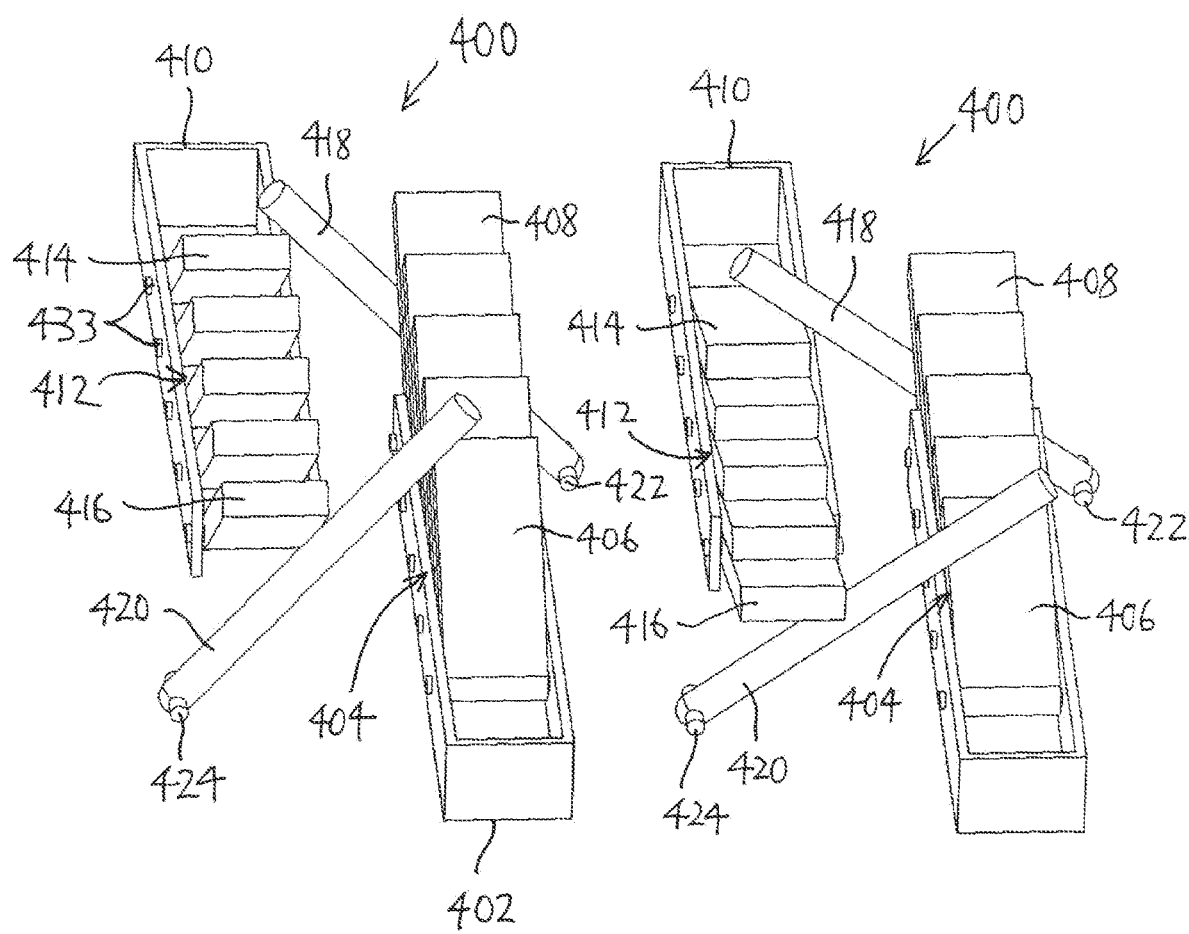
FIG. 22(a) is a perspective view of a domino-type torque generator in a first stage according to an eighth embodiment of the present disclosure.
FIG. 22(b) is a perspective view of the domino-type torque generator of FIG. 22(a) in a second stage according to the eighth embodiment of the present disclosure.

FIGS. 22(a)-(b) show an eighth embodiment of the domino-type torque generator 400. In this embodiment, the path is also a path with sharp turns. The domino-type torque generator 400 may include a first base member 402 having a first end and a second end; a first plurality of toppling members 404 including a first toppling member 406 located at the first end of the first base member 402, and a last toppling member 408 located at the second end of the first base member 402; a second base member 410 arranged side-by-side with the first base member 402, and having a first end and a second end; a second plurality of toppling members 412 including a first toppling member 414 located at the first end of the second base member 410, and a last toppling member 416 located at the second end of the second base member 410; a first rod 418 provided at the second end of the first base member 402, and pivotable about a first pivot point 422 between an up position where the first rod 418 is engageable with the last toppling member 408 of the first plurality of toppling members 404, and a down position where an upper end of the first rod 418 hits and topples the first toppling member 414 of the second plurality of toppling members 412; and a second rod 420 provided at the second end of the second base member 410, and pivotable about a second pivot point 424 between an up position where the second rod 420 is engageable with the last toppling member 416 of the second plurality of toppling members 412, and a down position where an upper end of the second rod 420 hits and topples the first toppling member 406 of the first plurality of toppling members 404.

When the first rod 418 pivots from its up position to its down position by the toppling of the last toppling member 408 of the first plurality of toppling members 404, the upper end of the first rod 418 hits and topples the first toppling member 414 of the second plurality of toppling members 412, which in turn topples following toppling members of the second plurality of toppling members 412, until the last toppling member 416 of the second plurality of toppling members 412 topples.

When the last toppling member 416 of the second plurality of toppling members 412 topples, the last toppling member 416 of the second plurality of toppling members 412 hits and drives the second rod 420 to pivot from its up position to its down position, which in turn hits and topples the first toppling member 406 of the first plurality of toppling members 404, which in turn topples following toppling members of the first plurality of toppling members 404, until the last toppling member 408 of the first plurality of toppling members 404 topples.

Finally, when the last toppling member 408 of the first plurality of toppling members 404 topples, the last toppling member 408 of the first plurality of toppling members 404 hits and drives the first rod 418 to pivot from its up position to its down position again, thereby continuously toppling the first plurality of toppling members 404 and the second plurality of toppling members 412 along the path, and continuously generating torques. Pivot shafts 433 can be torque shafts for generating torques.

While the present disclosure has been shown and described with particular references to a number of preferred embodiments thereof, it should be noted that various other changes or modifications may be made without departing from the scope of the appended claims.

What is claimed is:

1. A domino-type torque generator, comprising:
   a base member;
   a plurality of toppling members pivotally connected to the base member, each of the plurality of toppling members being pivotable from an upright position to an inclined position or from the inclined position directly to an opposite inclined position, the plurality of toppling members being arranged successively and sequentially along at least one path, and so spaced apart from one another that when a first one of the plurality of toppling members topples from its upright position to its inclined position, following ones of the plurality of toppling members topple successively and sequentially from their upright position to their inclined position, until a last one of the plurality of toppling members topples from its upright position to its inclined position, thereby producing a domino effect;
   a torque shaft fixedly connected to and extending transversely through a lower end portion of each of the plurality of toppling members, whereby toppling of each of the plurality of toppling members generates a torque on the torque shaft, the torque shaft defining a pivot axis about which each of the plurality of toppling members pivots, each torque shaft having a first section extending from a first side of the lower end portion of each of the plurality of toppling members, and an elongated second section extending from an opposite second side of the lower end portion of each of the plurality of toppling members, the first section and the elongated second section being pivotably mounted on the base member;
   a pinion fixedly mounted at a free end of the elongated second section of the torque shaft of each of the plurality of toppling members;
   a plurality of differential gear assemblies connected directly or indirectly to the pinions of the torque shafts of selected ones the plurality of toppling members, and served as a plurality of accumulators to accumulate torques generating on the torque shafts of the selected ones of the plurality of toppling members, wherein the plurality of differential gear assemblies comprises:
   a first differential gear assembly comprising a first side gear, a second side gear, and a first output gear of a first rotating cage for torque output, the first side gear of the first differential gear assembly being engageable with the pinion of the torque shaft of a first selected one of the plurality of toppling members, the second side gear of the first differential gear assembly being engageable with the pinion of the torque shaft of a second selected one of the plurality of toppling members, and
   a second differential gear assembly comprising a third side gear, a fourth side gear, and a second output gear of a second rotating cage for torque output, one of the third and fourth side gears of the second differential gear assembly being engageable directly or indirectly with the first output gear of the first rotating cage of the first differential gear assembly,
   whereby torques generated by the toppling of the first and second selected ones of the plurality of toppling members are transmitted to the first and second side gears of the first differential gear assembly respectively, accumulated by the first differential gear assembly, and output through the first output gear of the first rotating cage of the first differential gear assembly; an accumulated torque output through the first output gear of the first rotating cage of the first differential gear assembly is transmitted to one of the first and second side gears of the second differential gear assembly, and whereby torques transmitted to the first and second side gears of the second differential gear assembly are accumulated by the second differential gear assembly, and output through the second output gear of the second rotating cage of the second differential gear assembly, until a final accumulated torque is output through a last rotating cage of a last differential gear assembly; and a drive mechanism configured to repeatedly drive the plurality of toppling members to pivot from their upright position to their inclined position or from their inclined position to their opposite inclined position, and pivot from their inclined position to their upright position or from their opposite inclined position to their inclined position, thereby continuously toppling the plurality of toppling members, and continuously generating the torques.

2. A domino-type torque generator, comprising:

a base member;

a plurality of toppling members pivotally connected to the base member, each of the plurality of toppling members being pivotable from an upright position to an inclined position or from the inclined position to an opposite inclined position, the plurality of toppling members being arranged successively and sequentially along at least one path, and so spaced apart from one another that when a first one of the plurality of toppling members topples from its upright position to its inclined position, following ones of the plurality of toppling members topple successively and sequentially from their upright position to their inclined position, until a last one of the plurality of toppling members topples from its upright position to its inclined position, thereby producing a domino effect;

a torque shaft fixedly connected to and extending transversely through a lower end portion of each of the plurality of toppling members, whereby toppling of each of the plurality of toppling members generates a torque on the torque shaft, the torque shaft defining a pivot axis about which each of the plurality of toppling members pivots, each torque shaft having a first section extending from a first side of the lower end portion of each of the plurality of toppling members, and an elongated second section extending from an opposite second side of the lower end portion of each of the plurality of toppling members, the first section and the elongated second section being pivotably mounted on the base member;

a pinion fixedly mounted at a free end of the elongated second section of the torque shaft of each of the plurality of toppling members;

a plurality of differential gear assemblies connected directly or indirectly to the pinions of the torque shafts of selected ones the plurality of toppling members, and served as a plurality of accumulators to accumulate torques generating on the torque shafts of the selected ones of the plurality of toppling members; and a drive mechanism configured to repeatedly drive the plurality of toppling members to pivot from their upright position to their inclined position or from their inclined position to their opposite inclined position, and pivot from their inclined position to their upright position or from their opposite inclined position to their inclined position, thereby continuously toppling the plurality of toppling members, and continuously generating the torques.

3. The domino-type torque generator according to claim 2, wherein the plurality of differential gear assemblies comprises:

a first differential gear assembly comprising a first side gear, a second side gear, and a first output gear of a first rotating cage for torque output, the first side gear of the first differential gear assembly being engageable with the pinion of the torque shaft of a first selected one of the plurality of toppling members, the second side gear of the first differential gear assembly being engageable with the pinion of the torque shaft of a second selected one of the plurality of toppling members; and a second differential gear assembly comprising a third side gear, a fourth side gear, and a second output gear of a second rotating cage for torque output, one of the third and fourth side gears of the second differential gear assembly being engageable directly or indirectly with the first output gear of the first rotating cage of the first differential gear assembly, whereby torques generated by the toppling of the first and second selected ones of the plurality of toppling members are transmitted to the first and second side gears of the first differential gear assembly respectively, accumulated by the first differential gear assembly, and output through the first output gear of the first rotating cage of the first differential gear assembly; an accumulated torque output through the first output gear of the first rotating cage of the first differential gear assembly is transmitted to one of the first and second side gears of the second differential gear assembly, and whereby torques transmitted to the first and second side gears of the second differential gear assembly are accumulated by the second differential gear assembly, and output through the second output gear of the second rotating cage of the second differential gear assembly, until a final accumulated torque is output through a last rotating cage of a last differential gear assembly.

4. The domino-type torque generator according to claim 2, wherein the at least one path includes a closed path.

5. The domino-type torque generator according to claim 4, wherein the drive mechanism comprises a bottom weight member attached to and extending downwards from the torque shaft provided at the lower end portion of each of the plurality of toppling members, and the bottom weight member has a weight sufficient to automatically drive each of the plurality of toppling members from its inclined position back to its upright position.

6. The domino-type torque generator according to claim 4, wherein the drive mechanism comprises an electrical or electronic switch connected to the last one of the plurality of toppling members, and after the last one of the plurality of toppling members topples, the electrical or electronic switch drives the first one of the plurality of toppling members from its inclined position back to its upright position or its opposite inclined position.

7. The domino-type torque generator according to claim 4, wherein the drive mechanism comprises a top weight member provided on an upper end of the first one of the plurality of toppling members, the top weight member extending outwards in a direction in which the first one of the plurality of toppling members topples, and when the first one of the plurality of toppling members is in its upright position, the first one of the plurality of toppling members topples automatically by means of a weight of the top weight member.

8. The domino-type torque generator according to claim 5, wherein the drive mechanism comprises an electrical or electronic switch configured to drive the first one of the plurality of toppling members to topple from its upright position to its inclined position, so that the following ones of the plurality of toppling members topple successively and sequentially from their upright position to their inclined position, until the last one of the plurality of toppling members topples from its upright position to its inclined position,
   wherein the plurality of toppling members is driven automatically and successively from their inclined position back to their upright position by means of the weight of the bottom weight member provided on each of the plurality of toppling members, and
   wherein the electrical or electronic switch is configured to drive the first one of the plurality of toppling members to topple again, thereby continuously toppling the plurality of toppling members along the closed path, and continuously generating torques.

9. The domino-type torque generator according to claim 8, wherein the base member is an annular base member and the closed path is a circular path, and wherein the domino-type torque generator further comprises:
   a rotatable vertical shaft provided at a center of the annular base member; and
   a drive assembly mounted between the rotatable vertical shaft and the plurality of toppling members, and configured to gather driving forces generated from toppling of the plurality of toppling members and drive the rotatable vertical shaft to rotate, wherein the drive assembly is selected from a group consisting of magnets and magnetically attractive materials, gear assemblies, generators, and pressure pumps.

10. The domino-type torque generator according to claim 2, wherein the base member has a first end and a second end, the at least one path includes a non-closed path, the first one of the plurality of toppling members is pivotally mounted on the first end of the base member, and the last one of the plurality of toppling members is pivotally mounted on the second end of the base member,
   wherein the drive mechanism comprises:
   a first motor mounted on one side of the base member, and configured to turn the first one of the plurality of toppling members in a first direction from its inclined position directly to its opposite inclined position, so that the following ones of the plurality of toppling members are turned successively and sequentially in the first direction from their inclined position directly to their opposite inclined position, until the last one of the plurality of toppling members is turned in the first direction from its inclined position directly to its opposite inclined position; and
   a second motor mounted on the one side of the base member, and configured to turn the last one of the plurality of toppling members in an opposite second direction from its opposite inclined position directly to its inclined position, so that the following ones of the plurality of toppling members are turned successively and sequentially in the second direction from their opposite inclined position directly to their inclined position, until the first one of the plurality of toppling members is turned in the second direction from its opposite inclined position directly to its inclined position.

11. The domino-type torque generator according to claim 2, wherein the base member has a first end and a second end, the at least one path includes a non-closed path, the first one of the plurality of toppling members is pivotally mounted on the first end of the base member, and the last one of the plurality of toppling members is pivotally mounted on the second end of the base member,
   wherein the drive mechanism comprises:
   a third motor;
   a first drive member connected to and driven by the third motor, the third motor being mounted at the first end of the base member, and facing an outwardly facing surface of the first one of the plurality of toppling members, the first drive member of the third motor being configured to push the first one of the plurality of toppling members in a first direction from its inclined position directly to its opposite inclined position, so that the following ones of the plurality of toppling members are pushed successively and sequentially in the first direction from their inclined position directly to their opposite inclined position, until the last one of the plurality of toppling members is pushed in the first direction from its inclined position directly to its opposite inclined position;
   a fourth motor; and
   a second drive member connected to and driven by the fourth motor, the fourth motor being mounted at the second end of the base member, and facing an outwardly facing surface of the last one of the plurality of toppling members, the second drive member of the fourth motor being configured to push the last one of the plurality of toppling members in an opposite second direction from its opposite inclined position directly to its inclined position, so that the following ones of the plurality of toppling members are pushed successively and sequentially in the second direction from their opposite inclined position directly to their inclined position, until the first one of the plurality of toppling members is pushed in the second direction from its opposite inclined position directly to its inclined position.

12. The domino-type torque generator according to claim 2, wherein each of the plurality of toppling members comprises:
   a first torque shaft pivotably connected to the base member, the first torque shaft having a first half section and a second half section;
   a first toppling portion extending laterally and outwardly from the first half section of the first torque shaft; and
   a second toppling portion extending laterally and outwardly from the second half section of the first torque shaft,
   wherein the first and second toppling portions are oriented at a first angle with respect to each other about the first torque shaft, so that when the first toppling portion pivots to its upright position, the second toppling portion pivots at the same time to its inclined position; and when the first toppling portion pivots to its inclined position, the second toppling portion pivots at the same time to its upright position.

13. The domino-type torque generator according to claim 12, wherein the drive mechanism comprises a first switch and a second switch, the first switch being pivotally connected to a first end of the base member, and the second switch being pivotally connected to a second end of the base member, each of the first switch and the second switch comprising:
- a second torque shaft pivotably connected to the base member, the second torque shaft having a first half section and a second half section;
- an elongated switch portion extending laterally and outwardly from the first half section of the second torque shaft, and moveable between an up and inclined position and a down position, the elongated switch portion having a length longer than a length of the plurality of toppling members, and a weight sufficient to topple a following toppling member; and
- a shortened switch portion extending laterally and outwardly from the second half section of the second torque shaft, and moveable between an up and inclined position and a down position, the shortened switch portion having a length shorter than the length of the plurality of toppling members,
- wherein the elongated switch portion and the shortened switch portion are oriented at a second angle with respect to each other about the second torque shaft, so that when the shortened switch portion pivots from its up and inclined position to its down position, the elongated switch portion pivots from its up and inclined position to its down position; and when the shortened switch portion pivots from its down position to its up and inclined position, the elongated switch portion pivots from its down position to its up and inclined position, and
- wherein the elongated switch portion of the first switch is in connection with the first toppling portion of the first one of the plurality of toppling members, the shortened switch portion of the first switch is in connection with the second toppling portion of the first one of the plurality of toppling members, and the elongated switch portion of the second switch is in connection with the second toppling portion of the last one of the plurality of toppling members, the shortened switch portion of the second switch is in connection with the first toppling portion of the last one of the plurality of toppling members.

14. The domino-type torque generator according to claim 3, wherein the first differential gear assembly comprises:
- the first rotating cage having a first side and a second side opposite the first side;
- the first output gear formed around an outer circumference of the first rotating cage, and rotatable with the first rotating cage;
- a first cross shaft mounted inside and across an interior of the first rotating cage;
- a first bevel gear and a second bevel gear rotatably mounted on the first cross shaft;
- a third bevel gear meshed with both the first bevel gear and the second bevel gear at one side of the first cross shaft;
- a fourth bevel gear meshed with both the first bevel gear and the second bevel gear at an opposite side of the first cross shaft;
- the first side gear disposed outside the first rotating cage at the first side thereof, and connected coaxially to and rotatable with the third bevel gear; and
- the second side gear disposed outside the first rotating cage at the second side thereof, and connected coaxially to and rotatable with the fourth bevel gear,
- wherein the first and second side gears of the first differential gear assembly are rotatably connected to the first rotating cage, one of the first and second side gears of the first differential gear assembly is sufficient to drive the first rotating cage, and another one of the first and second side gears of the first differential gear assembly is at a standstill stage or is driven at any speed.

15. The domino-type torque generator according to claim 14, wherein the second differential gear assembly comprises:
- the second rotating cage having a first side and a second side opposite the first side;
- the second output gear formed around an outer circumference of the second rotating cage, and rotatable with the second rotating cage;
- a second cross shaft mounted inside and across an interior of the second rotating cage;
- a fifth bevel gear and a sixth bevel gear rotatably mounted on the second cross shaft;
- a seventh bevel gear meshed with both the fifth bevel gear and the sixth bevel gear at one side of the second cross shaft;
- an eighth bevel gear meshed with both the fifth bevel gear and the sixth bevel gear at an opposite side of the second cross shaft;
- the third side gear disposed outside the second rotating cage at the first side thereof, and connected coaxially to and rotatable with the seventh bevel gear;
- the fourth side gear disposed outside the second rotating cage at the second side thereof, and connected coaxially to and rotatable with the eighth bevel gear through a first common shaft;
- a first connection gear meshed with the fourth side gear; and
- a second connection gear connected coaxially to and rotatable with the first connection gear through a second common shaft, the second connection gear being meshed with the first output gear of the first differential gear assembly,
- wherein the third and fourth side gears of the second differential gear assembly are rotatably connected to the second rotating cage, one of the third and fourth side gears of the second differential gear assembly is sufficient to drive the second rotating cage, and another one of the third and fourth side gears of the second differential gear assembly is at a standstill stage or is driven at any speed.

16. The domino-type torque generator according to claim 2, wherein any one of the plurality of differential gear assemblies is replaceable by an epicyclic gear train, the epicyclic gear train comprising:
- a central sun gear;
- a plurality of planet gears meshed with and rotatable around the central sun gear;
- an outer ring gear meshed with the plurality of planet gears; and
- a carrier on which the plurality of planet gears are rotatably mounted,
- whereby external torques applied to the central sun gear and the outer ring gear are accumulated and output through the carrier.

17. The domino-type torque generator according to claim 13, wherein the at least one path includes an upper level and a lower level, the domino-type torque generator comprising:
- a first plurality of toppling members disposed on the upper level;
- a second plurality of toppling members disposed on the lower level;

a first link having an upper end connected to the first switch of the first plurality of toppling members on the upper level, and a lower end connected to the first switch of the second plurality of toppling members on the lower level; and a second link having an upper end connected to the second switch of the first plurality of toppling members on the upper level, and a lower end connected to the second switch of the second plurality of toppling members on the lower level.

18. The domino-type torque generator according to claim 2, wherein the first one of the plurality of toppling members is pivotally connected to the base member through a first torque shaft, a second toppling member following the first one of the plurality of toppling members is pivotally connected to the base member through a second torque shaft, and a third toppling member following the second toppling member is pivotally connected to the base member through a third torque shaft, wherein a height of the third toppling member is greater than a height of the second toppling member, and the height of the second toppling member is greater than a height of the first one of the plurality of toppling members, wherein a torque generated on the third torque shaft is greater than a torque generated on the second torque shaft, and the torque generated on the second torque shaft is greater than a torque generated on the first torque shaft when the first one of the plurality of toppling members, the second toppling member and the third toppling member topple successively, and when the first one of the plurality of toppling members, the second toppling member and the third toppling member topple successively, the first one of the plurality of toppling members, being smaller in size than the second toppling member, has a weight sufficient to drive the second toppling member to topple; and the second toppling member, being smaller in size than the third toppling member, has a weight sufficient to drive the third toppling member to topple.

19. The domino-type torque generator according to claim 2, wherein the at least one path includes a path with sharp turns, and the domino-type torque generator comprises:

a vertical bar pivotally connected to an upper end of a first upright support at a first pivot point located at a lower end of the vertical bar;

a first bar extending from an upper end of the vertical bar in a first direction, the first bar being pivotable about the first pivot point between an up position and a down position;

a switch member extending from the lower end of the vertical bar in a second direction opposite the first direction, the switch member being pivotable about the first pivot point between an up position and a down position, the first bar being longer than the switch member so that the first bar topples from its up position to its down position by its own weight when the switch member is disengaged;

a second bar pivotally connected to an upper end of a second upright support at a second pivot point offset from a center of the second bar, and forming a short portion and a long portion on opposite sides of the second pivot point, the short portion of the second bar urging upwards against an underside of the first bar due to a downward force of the long portion of the second bar, the short portion of the second bar being pivotable between an up position and a down position;

a third bar pivotally connected to an upper end of a third upright support at a third pivot point offset from a center of the third bar, and forming a short portion and a long portion on opposite sides of the third pivot point, the short portion of the third bar urging upwards against an underside of the short portion of the second bar due to a downward force of the long portion of the third bar, the short portion of the third bar being pivotable between an up position and a down position; and a last bar pivotally connected to an upper end of a fourth upright support at a fourth pivot point offset from a center of the last bar, and forming a short portion and a long portion on opposite sides of the fourth pivot point, the short portion of the last bar urging upwards against an underside of the short portion of the third bar due to a downward force of the long portion of the last bar, the short portion of the last bar being pivotable between an up position where the short portion of the last bar is disengaged from the switch member and a down position where the short portion of the last bar is engaged with and pressing on an upper side of the switch member.

20. The domino-type torque generator according to claim 2, wherein the at least one path includes a path with sharp turns, and the domino-type torque generator comprises:

a first base member having a first end and a second end;

a first plurality of toppling members including a first toppling member located at the first end of the first base member, and a last toppling member located at the second end of the first base member;

a second base member arranged side-by-side with the first base member, and having a first end and a second end;

a second plurality of toppling members including a first toppling member located at the first end of the second base member, and a last toppling member located at the second end of the second base member;

a first rod provided at the second end of the first base member, and pivotable about a first pivot point between an up position where the first rod is engageable by the last toppling member of the first plurality of toppling members, and a down position where an upper end of the first rod hits and topples the first toppling member of the second plurality of toppling members; and a second rod provided at the second end of the second base member, and pivotable about a second pivot point between an up position where the second is engageable by the last toppling member of the second plurality of toppling members, and a down position where an upper end of the second rod hits and topples the first toppling member of the first plurality of toppling members.

* * * * *